(12) United States Patent
Khajeh et al.

(10) Patent No.: US 11,231,816 B2
(45) Date of Patent: *Jan. 25, 2022

(54) ULTRASONIC WATER-AGNOSTIC TOUCH DETECTION SENSOR

(71) Applicant: Apple Inc., Cupertino, CA (US)

(72) Inventors: Ehsan Khajeh, Los Gatos, CA (US); Brian Michael King, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,758

(22) Filed: Mar. 31, 2021

(65) Prior Publication Data

US 2021/0405809 A1   Dec. 30, 2021

Related U.S. Application Data

(63) Continuation-in-part of application No. 16/917,779, filed on Jun. 30, 2020.

(51) Int. Cl.
*G06F 3/043* (2006.01)
*G06F 3/041* (2006.01)
*G06F 3/044* (2006.01)

(52) U.S. Cl.
CPC .......... *G06F 3/0436* (2013.01); *G06F 3/0412* (2013.01); *G06F 3/0446* (2019.05); *G06F 3/04182* (2019.05)

(58) Field of Classification Search
CPC .. G06F 3/0436; G06F 3/0412; G06F 3/04182; G06F 3/0446
See application file for complete search history.

(56) References Cited

U.S. PATENT DOCUMENTS

| 5,591,945 | A | * | 1/1997 | Kent | G06F 3/0418 178/18.04 |
| 6,060,812 | A | * | 5/2000 | Toda | G06F 3/0436 310/313 B |
| 6,091,406 | A | * | 7/2000 | Kambara | G06F 3/0436 345/177 |
| 7,006,081 | B2 | * | 2/2006 | Kent | G06F 3/043 345/177 |
| 2004/0168516 | A1 | * | 9/2004 | Kent | B06B 1/0688 73/579 |

(Continued)

*Primary Examiner* — Amit Chatly
(74) *Attorney, Agent, or Firm* — Kubota & Basol LLP

(57) ABSTRACT

An ultrasonic touch sensing system that uses both compressional and shear waves for touch and water detection is disclosed. When no touch or water is present, less shear and compressional wave energy is absorbed, so both shear and compressional wave reflections do not have significant amplitude decreases. When a finger is in contact with the sensing plate, both shear and compressional wave energy is absorbed, so both shear and compressional wave reflections have significant amplitude decreases. When water is in contact with the sensing plate, compressional energy is absorbed but little or no shear wave energy is absorbed, so while compressional wave reflections have significant amplitude decreases, shear wave reflections do not. From these amplitudes, a determination can be made as to whether no touch is present on the sensing plate, whether a touch is present on the sensing plate, or whether water is present on the sensing plate.

25 Claims, 17 Drawing Sheets

(56) References Cited

U.S. PATENT DOCUMENTS

| | | | | |
|---|---|---|---|---|
| 2004/0246239 A1* | 12/2004 | Knowles | ................ | H01H 13/83 |
| | | | | 345/177 |
| 2016/0345113 A1* | 11/2016 | Lee | ......................... | G01S 15/04 |
| 2018/0032211 A1* | 2/2018 | King | ..................... | G06F 1/1694 |
| 2019/0121460 A1* | 4/2019 | Ting | ...................... | G06F 3/0436 |
| 2019/0235656 A1* | 8/2019 | Khajeh | ................ | G06F 3/0416 |
| 2019/0243047 A1* | 8/2019 | Khajeh | ................ | G06F 3/0436 |
| 2019/0354210 A1* | 11/2019 | Akhbari | ................ | G06F 3/0436 |
| 2019/0354238 A1* | 11/2019 | Akhbari | ................ | G06F 3/0416 |
| 2020/0333914 A1* | 10/2020 | Khajeh | ................... | G06F 3/043 |

\* cited by examiner

ULTRASONIC WATER-AGNOSTIC TOUCH DETECTION SENSOR

CROSS-REFERENCE TO RELATED APPLICATIONS

This application is a continuation-in-part of U.S. patent application Ser. No. 16/917,779, filed on Jun. 30, 2020, the contents of which are incorporated by reference herein in their entirety for all purposes.

FIELD OF THE DISCLOSURE

This relates generally to touch sensing and, more particularly, to ultrasonic water-agnostic touch detection systems capable of detecting touches and also water on a detection surface.

BACKGROUND OF THE DISCLOSURE

Many types of input mechanisms are presently available for performing operations in a computing system, such as buttons or keys, mice, trackballs, joysticks and the like. Touch-sensitive surfaces, and touch screens in particular, have become extremely popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch.

With touch-sensitive surfaces being incorporated into more and more devices, the types of physical and ambient environments in which they are expected to operate are also increasing. For example, touch sensing capability is desired in devices where water or other liquid may be present, and there is increasing interest in incorporating touch sensing into thicker sensing surfaces and metal sensing surfaces. However, capacitive-type touch sensing systems can experience reduced performance due to electrically floating objects (e.g., water droplets) in contact with the touch-sensitive surface, which may not be distinguishable from an actual touch. In addition, capacitive-type touch sensing systems can have difficulty detecting touches on metal touch surfaces, and on thick touch surfaces. Force sensing, on the other hand, can detect an actual touch and ignore water or other liquids, but may not work well on thick or metal surfaces, because these types of surfaces may be stiff enough to resist the bending or compression needed for accurate force sensing.

SUMMARY

This relates to an ultrasonic touch sensing system that uses both compressional waves and shear waves for improved touch and water (or other liquid) detection. For example, an ultrasonic shear transducer can transmit a shear wave through a sensing plate (e.g., cover glass), and can also generate a parasitic compressional wave as well. The shear and compressional waves react differently when a touch or water (or other liquid) is present on the sensing plate. When a finger is in contact with the sensing plate, both shear and compressional wave energy is absorbed and the reflections of both the shear wave and the compressional wave can significantly decrease in amplitude. In contrast, when water (or other liquid) is in contact with the sensing plate, compressional energy is absorbed and the reflection of the compressional wave can significantly decrease in amplitude, while little or no energy from the shear wave is absorbed, so the reflection of the shear wave can be received without a significant decrease in amplitude. In addition, one or more of the ultrasonic stimulation center frequency, stimulation frequency spectrum, type of material and the thickness of the material can be selected such that reflections of the shear and compressional waves can be received at different time periods. The amplitude of the reflections from the shear waves and the amplitude of the reflections from the compressional waves can be measured within those different time periods. From these amplitudes, a determination can be made as to whether no touch is present on the sensing plate, whether a touch is present on the sensing plate, or whether water (or other liquid) is present on the sensing plate. When a plurality of ultrasonic shear transducers are employed, such as in an array, the location of the touch or water can also be determined.

This also relates to an ultrasonic touch sensing system that can utilize a plurality of ultrasonic transducers to generate both shear and compressional non-propagating (i.e., standing or resonating) waves, each at a different resonant frequency, at the sensing plate (e.g., front crystal). The shear and compressional standing waves can respond differently within the sensing plate when a touching object (e.g., a finger) is present on the sensing plate, or when water (or other liquid) is present on the sensing plate. When an object such as a finger is in contact with the sensing plate, both shear and compressional wave energy can be absorbed and the energy of both the shear wave and the compressional wave within the sensing plate can significantly decrease in amplitude. When water (or other liquid) is in contact with the sensing plate, compressional wave energy can also be absorbed and the energy of the compressional wave within the sensing plate can also significantly decrease in amplitude. However, little or no shear wave energy may be absorbed when water (or other liquid) is present, so the energy of the shear wave within the sensing plate may not significantly decrease in amplitude. The amplitude of the resonating shear waves and the amplitude of the resonating compressional waves can be measured at each transducer. From these amplitudes, a determination can be made as to whether no object or liquid is present on the sensing plate at the location of that transducer, whether an object is present on the sensing plate at the location of that transducer, or whether liquid is present on the sensing plate at the location of that transducer. When a plurality of ultrasonic transducers are employed, such as in an array, the location of the object or liquid can also be determined.

BRIEF DESCRIPTION OF THE DRAWINGS

FIGS. 11A-11C illustrates the primary layers of an ultrasonic transducer array according to examples of the disclosure.

DETAILED DESCRIPTION

Figure 1A:
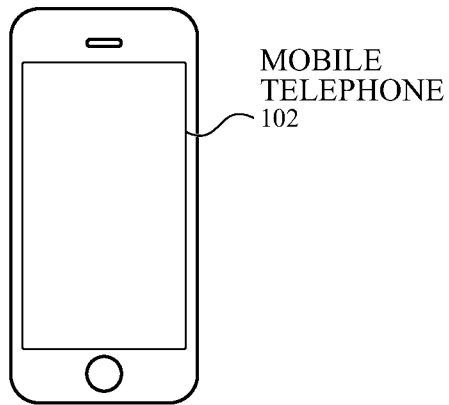
FIGS. 1A-1E illustrate electronic devices that can include ultrasonic touch and water detection according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Examples of the disclosure are directed to an ultrasonic touch sensing system that uses both compressional waves and shear waves for improved touch and water (or other liquid) detection. For example, an ultrasonic shear transducer can transmit a shear wave through a sensing plate (e.g., cover glass), and can also generate a parasitic compressional wave as well. The shear and compressional waves react differently when a touch or water (or other liquid) is present on the sensing plate. When a finger is in contact with the sensing plate, both shear and compressional wave energy is absorbed and the reflections of both the shear wave and the compressional wave can significantly decrease in amplitude. In contrast, when water (or other liquid) is in contact with the sensing plate, compressional energy is absorbed and the reflection of the compressional wave can significantly decrease in amplitude, while little or no energy from the shear wave is absorbed, so the reflection of the shear wave can be received without a significant decrease in amplitude. In addition, one or more of the ultrasonic stimulation center frequency, stimulation frequency spectrum, type of material and the thickness of the material can be selected such that reflections of the shear and compressional waves can be received at different time periods. The amplitude of the reflections from the shear waves and the amplitude of the reflections from the compressional waves can be measured within those different time periods. From these amplitudes, a determination can be made as to whether no touch is present on the sensing plate, whether a touch is present on the sensing plate, or whether water (or other liquid) is present on the sensing plate. When a plurality of ultrasonic shear transducers are employed, such as in an array, the location of the touch or water can also be determined. Note that although the term "water" may be primarily used herein for brevity, it should be understood that examples of the disclosure are not limited to the detection of water, but include the detection of liquids other than water.

Examples of the disclosure are also directed to an ultrasonic touch sensing system that can utilize a plurality of ultrasonic transducers to generate both shear and compressional non-propagating (standing) waves, each at a different resonant frequency, at the sensing plate (e.g., front crystal). The shear and compressional standing waves can respond differently within the sensing plate when a touching object (e.g., a finger) is present on the sensing plate, or when water (or other liquid) is present on the sensing plate. When an object such as a finger is in contact with the sensing plate, both shear and compressional wave energy can be absorbed and the energy of both the shear wave and the compressional wave within the sensing plate can significantly decrease in amplitude. When water (or other liquid) is in contact with the sensing plate, compressional wave energy can also be absorbed and the energy of the compressional wave within the sensing plate can also significantly decrease in amplitude. However, little or no shear wave energy may be absorbed when water (or other liquid) is present, so the energy of the shear wave within the sensing plate may not significantly decrease in amplitude. The amplitude of the resonating shear waves and the amplitude of the resonating compressional waves can be measured at each transducer. From these amplitudes, a determination can be made as to whether no object or liquid is present on the sensing plate at the location of that transducer, whether an object is present on the sensing plate at the location of that transducer, or whether liquid is present on the sensing plate at the location of that transducer. When a plurality of ultrasonic compressional wave transducers are employed, such as in an array, the location of the object or liquid can also be determined.

Figure 1B:
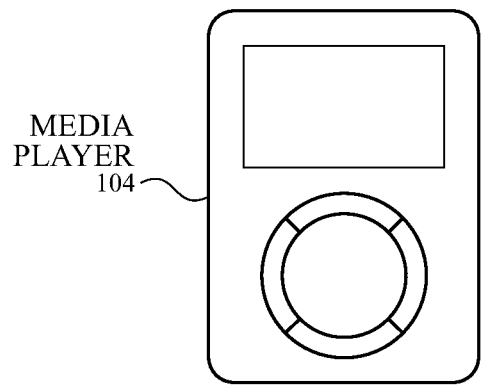
Figure 1C:
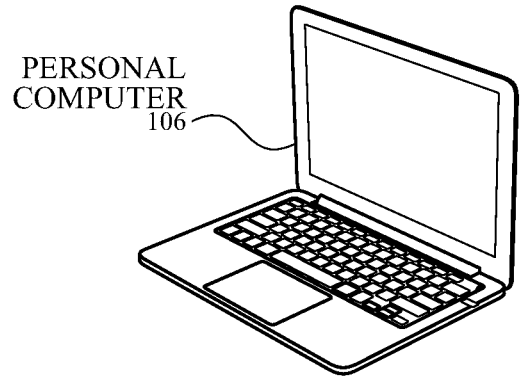
Figure 1D:
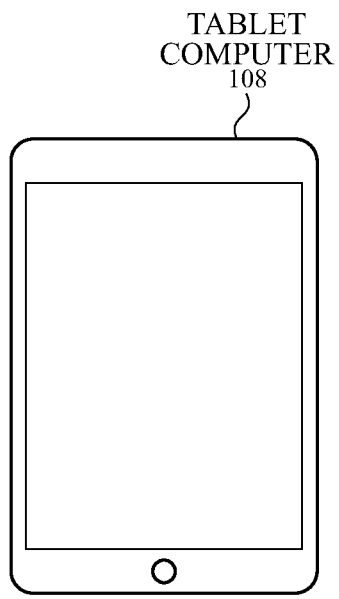
Figure 1E:
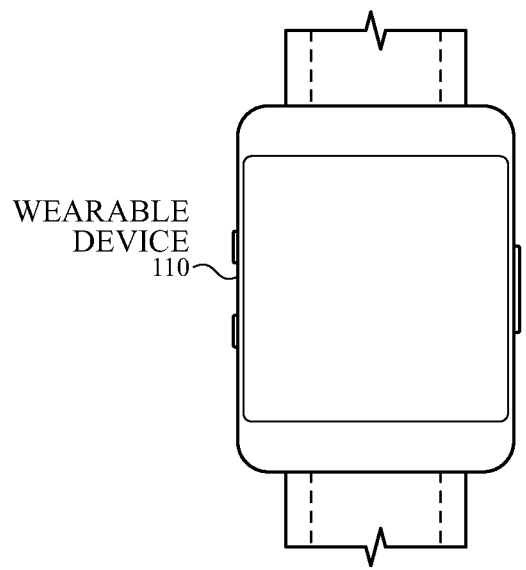

FIGS. 1A-1E illustrate electronic devices that can include ultrasonic touch and water detection according to examples of the disclosure. FIG. 1A illustrates mobile telephone 102 that can include ultrasonic touch and water detection according to examples of the disclosure. FIG. 1B illustrates digital media player 104 that can include ultrasonic touch and water detection according to examples of the disclosure. FIG. 1C illustrates personal computer 106 that can include ultrasonic touch and water detection according to examples of the disclosure. FIG. 1D illustrates tablet computing device 108 that can include ultrasonic touch and water detection according to examples of the disclosure. FIG. 1E illustrates wearable device 110 (e.g., a watch) that can include ultrasonic touch and water detection according to examples of the disclosure. It should be understood that the example devices illustrated in FIGS. 1A-1E are provided as examples, and other types of devices can include ultrasonic touch and water detection according to examples of the disclosure.

Ultrasonic sensors can be incorporated in the above-described devices to add touch and water sensing capabilities to a touch sensing surface of the system. For example, in some examples, an ultrasonic touch sensing system can replace or augment a touch screen (e.g., capacitive, resistive, etc.) to provide touch sensing capability in wet environments or under conditions where the device may get wet (e.g., exercise, swimming, rain, washing hands). In some examples, an otherwise non-touch-sensitive display screen can be augmented with ultrasonic sensors to provide touch sensing capability. In such examples, a touch-sensitive display can be implemented without the stack-up required for a capacitive touch screen. In some examples, the ultrasonic sensors can be used to provide touch sensing capability for a non-display surface. For example, the ultrasonic sensors can be used to provide touch sensing capabilities for a track pad, a button, a scroll wheel, part or all of the housing or any other surfaces of the device (e.g., on the front, rear or sides).

Figure 2:
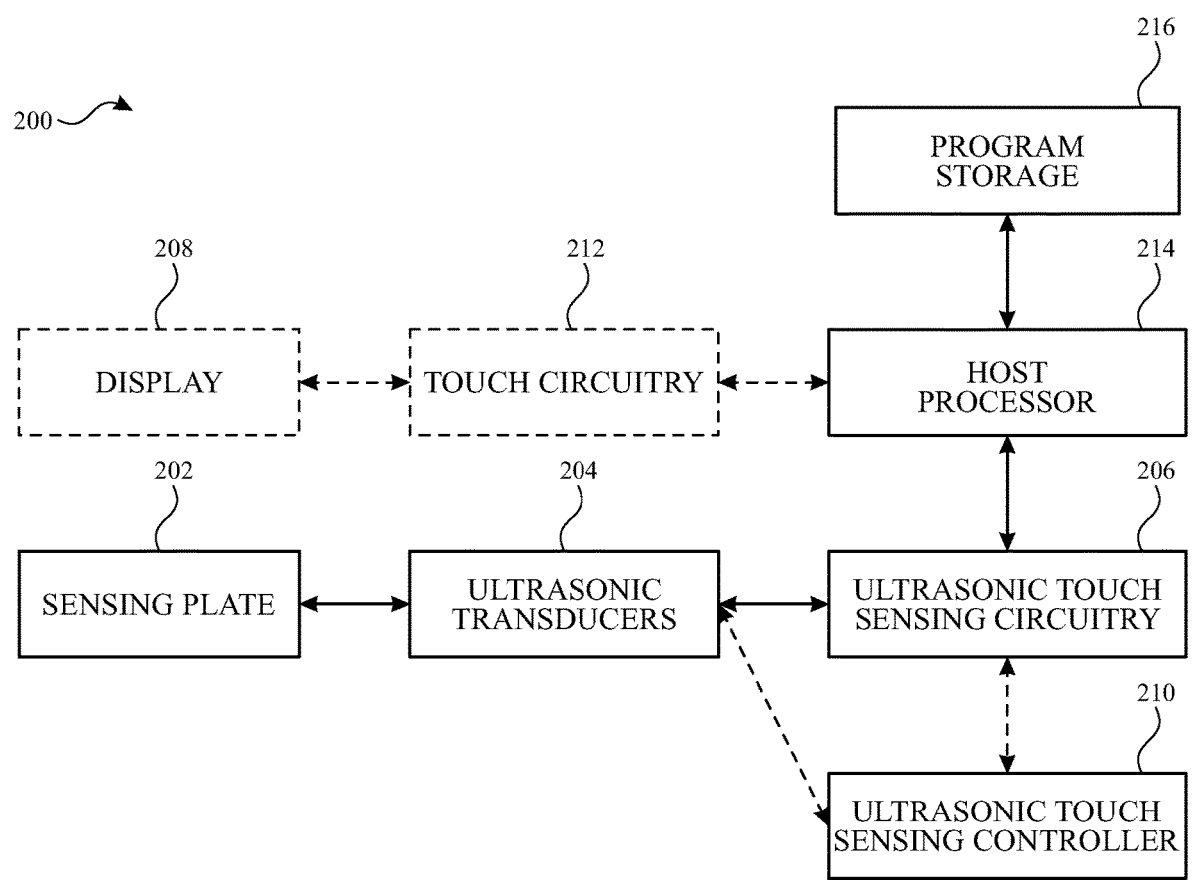
FIG. 2 illustrates a block diagram of an electronic device including an ultrasonic touch and water sensing system according to examples of the disclosure.

FIG. 2 illustrates a block diagram of an electronic device including an ultrasonic touch and water sensing system according to examples of the disclosure. In some examples, sensing plate 202 of device 200 (which can correspond to devices 102, 104, 106, 108 and 110 above) can be coupled with one or more ultrasonic transducers 204. In some examples, ultrasonic transducers 204 can be piezoelectric shear wave transducers, which can be made to vibrate by the application of electrical signals when acting as a transmitter, and can generate electrical signals based on detected vibrations when acting as a receiver. In some examples, ultrasonic transducers 204 can be formed from a piezoelectric ceramic material (e.g., lead zirconate titanate (PZT) or potassium sodium niobate (KNN)) or a piezoelectric plastic material (e.g., polyvinylidene fluoride (PVDF)). In some examples, ultrasonic transducers 204 can be bonded to sensing plate 202 by a bonding agent (e.g., a thin layer of stiff epoxy). In some examples, ultrasonic transducers 204 can be deposited on the surface of sensing plate 202 through processes such as deposition, lithography, or the like. In some examples, ultrasonic transducers 204 can be bonded to the surface of sensing plate 202 using conductive or non-conductive bonding materials. When electrical energy is applied to ultrasonic transducers 204, it can cause the transducers and any material in contact with the transducers to vibrate, and the vibrations of the molecules of the material can propagate as an ultrasonic wave in various modes through sensing plate 202.

In some examples, sensing plate 202 can be partially or completely disposed under or within display 208 (e.g., an Organic Light Emitting Diodes (OLED) display), with dashed lines indicating its optional existence. In some examples, touch circuitry 212 can also be partially or completely disposed under or within display 208 to form a touch screen (e.g., capacitive), and ultrasonic transducers 204 can be partially or completely disposed on (or coupled to) a portion of the touch screen. For example, the touch screen may comprise a glass or plastic panel (sensing plate), and a display region of the touch screen may be surrounded by a non-display region (e.g., a black border region surrounding the periphery of the display region of touch screen). In some examples, ultrasonic transducers 204 can be disposed partially or completely in the black mask region of the touch screen panel (e.g., on the back side of the panel behind the black mask) such that the transducers are not visible (or are only partially visible) to a user. In other examples, ultrasonic transducers 204 can be partially or completely disposed under or behind a trackpad, or under one or more sides or back of the housing.

Device 200 can further comprise ultrasonic touch sensing circuitry 206, which can include circuitry for driving electrical signals to stimulate vibration of ultrasonic transducers 204 (e.g., transmit circuitry), as well as circuitry for sensing electrical signals output by the transducers (e.g., receive circuitry) when the transducer is stimulated by received ultrasonic energy. In some examples, timing operations for ultrasonic touch sensing circuitry 206 can optionally be provided by a separate ultrasonic touch sensing controller 210 that can control timing of the ultrasonic touch sensing circuitry operations. In some examples, ultrasonic touch sensing controller 210 can be coupled between ultrasonic touch sensing circuitry 206 and host processor 214. In some examples, controller functions can be integrated with ultrasonic touch sensing circuitry 206 (e.g., on a single integrated circuit). Output data from ultrasonic touch sensing circuitry 206 can be output to host processor 214 for further processing to determine a touch or water in contact with the device, as will be described in more detail below. In some examples, the processing for determining a touching object or water can be performed by ultrasonic touch sensing circuitry 206, ultrasonic touch sensing controller 210 or a separate subprocessor of device 200 (not shown).

Device 200 can also include an optional touch controller (not shown) in addition to optional touch circuitry 212. In examples including a touch controller, the touch controller can be disposed between touch circuitry 212 and host processor 214. Touch circuitry 212 can, for example, be capacitive or resistive touch sensing circuitry, and can be used to detect contact and/or hovering of objects (e.g., fingers, styli) in contact with and/or in proximity to the touch screen, particularly in the display region of the touch screen. Thus, device 200 can include multiple types of sensing circuitry (e.g., touch circuitry 212 and ultrasonic transducers 204) for detecting objects (and in some instances their positions) in different regions of the device and for different purposes, as will be described in more detail below.

Host processor 214 can receive ultrasonic outputs from ultrasonic touch sensing circuitry 206 or other touch outputs (e.g., capacitive) from touch circuitry 212 and perform actions based on the touch outputs. Host processor 214 can also be connected to program storage 216 and display 208. Host processor 214 can, for example, communicate with display 208 to generate an image on the display, such as an image of a UI, and can use touch sensing circuitry 212 and/or ultrasonic touch sensing circuitry 206 (and, in some examples, their respective controllers) to detect a touch on or near the touch screen, such as a touch input to the displayed UI. The touch input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing.

Note that one or more of the functions described herein can be performed by firmware stored in memory and executed by the touch circuitry 212 and/or ultrasonic touch sensing touch sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device or can be distributed between multiple devices. Furthermore, it should be understood that the connections between the components are exemplary, and different unidirectional or bidirectional connections can be included between the components depending on the implementation, irrespective of the arrows shown in the configuration of FIG. 2.

As noted above, examples of the disclosure are directed to an ultrasonic touch sensing system that uses both compressional waves and shear waves for improved touch and water detection. Shear waves, also known as transverse waves, create displacements that are orthogonal to the direction of propagation of a wave. Shear waves (and their reflections) provide advantages when used to detect objects on a surface of a sensing plate, because while their reflections are affected by a touching object, they are (relatively) unaffected by water. Thus, shear waves can be used to detect a touch, without detecting water. In addition, shear waves can effectively detect touches on thick sensing plates and metal sensing plate, and can detect light touches. Thus, shear waves can be used with a number of different sensing plate configurations to make a touch/no-touch determination, providing the advantage of greater flexibility in material type and thickness. However, shear waves cannot be used to affirmatively detect the presence of water.

Ultrasonic transducers also generate ultrasonic energy in modes other than shear modes, such as compressional modes. Compressional waves create displacements that are in the same direction as the propagation of the wave. Unlike shear wave reflections, compressional wave reflections are affected by both touching objects and water. Because compressional waves are affected by water, under certain circumstances they can interact with water and cause attenuation of reflected waves and the introduction of ambiguity between a touch and the presence of water, resulting in errors in the accuracy of the touch sensing and the loss of accurate water-agnostic touch sensing capability. However, rather than treating compressional waves as noise or parasitic waves that are to be suppressed or removed, examples of the disclosure treat the water-detecting property of compressional waves as an advantage, and utilize compressional wave reflections along with shear wave reflections to provide both touch and water detection, and in some examples more accurate touch detection. For example, monitoring the reduction in amplitude or energy of a compressional wave reflection can provide a more robust indication or measurement of whether a touch is present. To make this determination, returning ultrasonic energy in the reflected waves can be received by the transducer, and the ultrasonic energy can be converted to an electrical signal by the transducer to determine the amplitude or energy of the reflected wave.

To perform touch and water detection, examples of the disclosure can determine whether the amplitude or energy of a reflected shear wave is below a first predetermined threshold, and whether the amplitude or energy of a reflected compressional wave is below a second predetermined threshold. If both conditions are satisfied, it can be determined that a touch is present at the sensing plate. However, if the amplitude or energy of the reflected shear wave is above the first predetermined threshold, and the amplitude or energy of the reflected compressional wave is below the second predetermined threshold, it can be determined that water is present at the sensing plate. If the amplitude or energy of the reflected shear wave is above the first predetermined threshold, and the amplitude or energy of the reflected compressional wave is above the second predetermined threshold, it can be determined that no touch or water is present at the sensing plate.

Making these amplitude or energy threshold determinations can be complicated or error-prone because the shear wave and compressional wave reflections often overlap in time. Therefore, examples of the disclosure utilize velocity differences between compressional and shear waves (e.g., for certain materials and thicknesses, compressional waves are about 1.6 to 1.7 times faster than shear waves) to identify windows of time where the shear and compressional wave reflections are separated. Within those windows, the amplitudes or energy levels of shear wave or compressional wave reflections can be measured more accurately, with less interference from other waves.

Figure 3A:
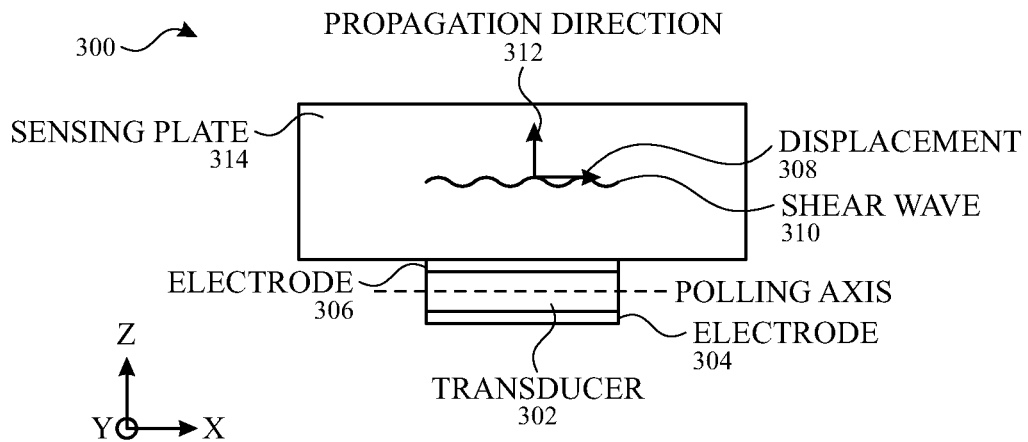
FIG. 3A illustrates a symbolic shear wave transducer implementation generating a shear wave according to examples of the disclosure.

FIG. 3A illustrates a symbolic shear wave transducer implementation 300 generating a shear wave according to examples of the disclosure. In the example of FIG. 3A, shear wave transducer 302 can be oriented along the x-axis (the polling axis) and formed with (e.g., bonded or otherwise coupled to) sensing plate 314. Shear wave transducer 302 can vibrate by repeatedly switching the polarity of a voltage across electrodes 304 and 306 to create displacement 308 along the x-axis, parallel to the sensing plate surface. If the polling direction and electrode configuration are chosen appropriately, shear waves (illustrated symbolically at 310) can be created along the z-axis (in propagation direction 312). However, due to physical imperfections in transducer 302 and electrodes 304 and 306, a parasitic compressional wave can also be propagated in the z-direction.

Figure 3B:
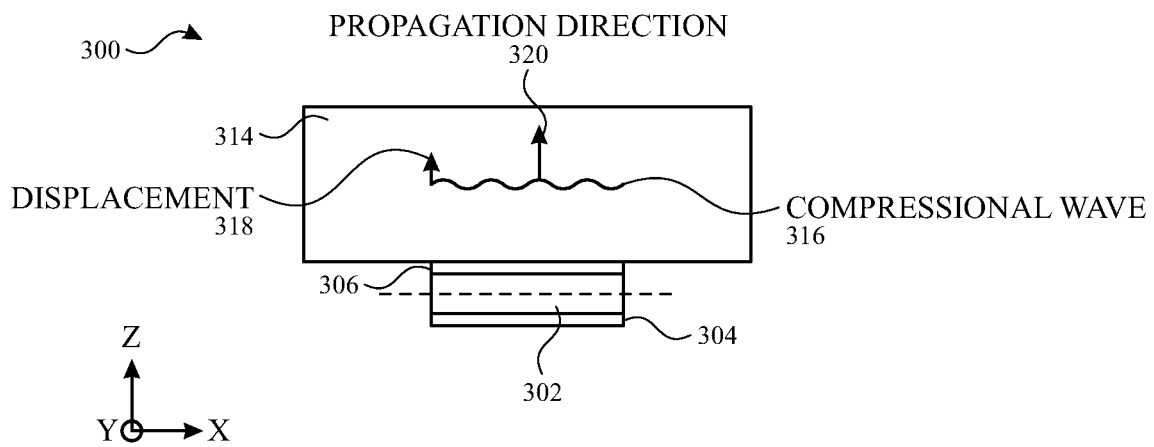
FIG. 3B illustrates a symbolic shear wave transducer implementation generating a compressional wave according to examples of the disclosure.

FIG. 3B illustrates a symbolic shear wave transducer implementation 300 generating a compressional wave according to examples of the disclosure. In the example of FIG. 3B, parasitic compressional wave 316 can be formed due to small unintended displacements 318 of shear wave transducer 304 in the z-direction and corners of the transducer. As can be seen from FIGS. 3A and 3B, both shear wave 310 and parasitic compressional wave 316 generated by shear wave transducer 304 propagate in the z-direction, where an object such as a finger or water may be present on the surface of sensing plate 314. However, as discussed in further detail below, the interactions of shear wave 310 and compressional wave 316 with those objects produce different results.

Figure 4A:
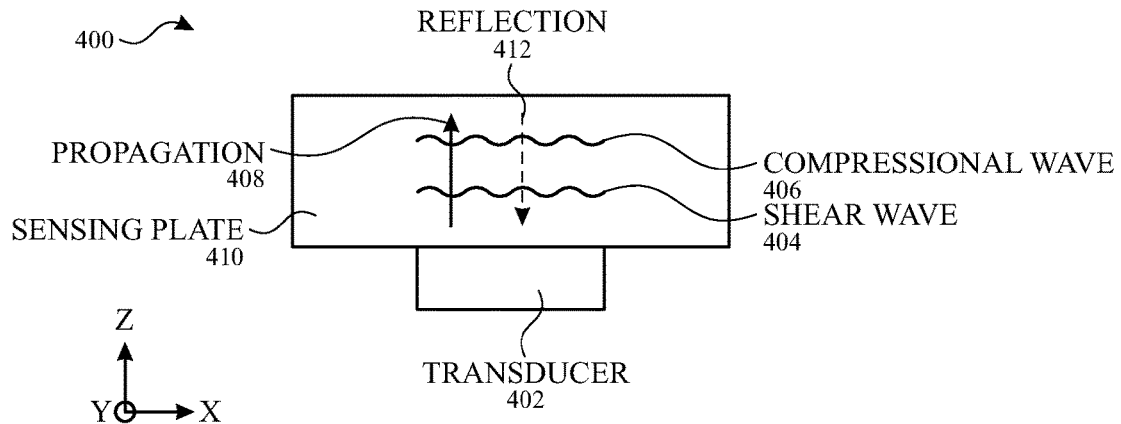
FIG. 4A illustrates a symbolic shear wave transducer implementation with no touching object present according to examples of the disclosure.

FIG. 4A illustrates a symbolic shear wave transducer implementation 400 with no touching object present according to examples of the disclosure. In the example of FIG. 4A, shear wave transducer 402 generates both shear wave 404 and compressional wave 406 as discussed above, both with a z-axis propagation direction 408. In the absence of an object touching sensing plate 410, both shear wave 404 and compressional wave 406 are reflected back to shear wave transducer 402 as shown by reflected wave 412 (symbolically illustrating both separate reflections) with a relatively small drop in amplitude or energy.

Figure 4B:
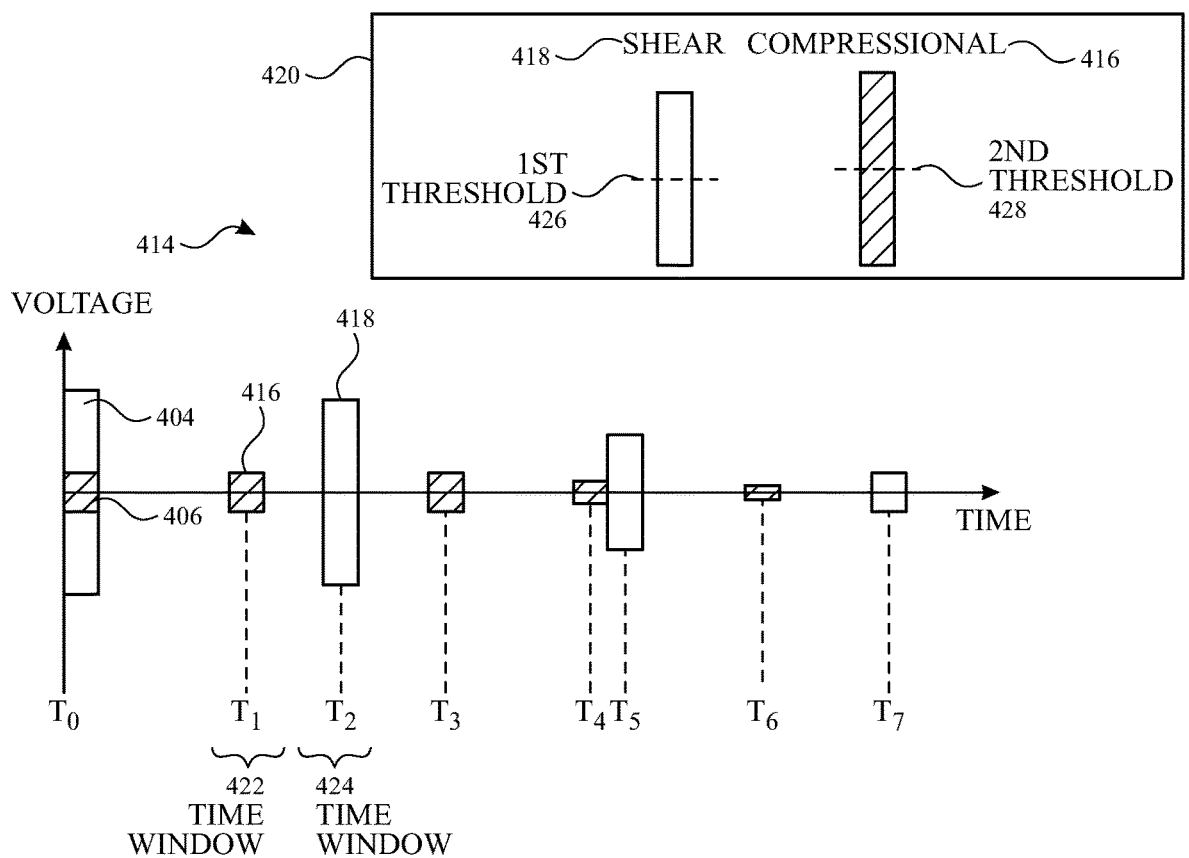
FIG. 4B illustrates a symbolic shear wave transducer reflected wave timing diagram corresponding to the shear wave transducer implementation of FIG. 4A according examples of the disclosure.

FIG. 4B illustrates a symbolic shear wave transducer reflected wave timing diagram 414 corresponding to the shear wave transducer implementation of FIG. 4A according examples of the disclosure. Note that all waves, amplitudes and timing shown in FIG. 4B are symbolic and not to scale. In the example of FIG. 4B, a shear wave transducer can generate both shear wave 404 and compressional wave 406 at time t0, and because of the greater velocity of the compressional wave, a round trip of first compressional wave reflection 416 can be received back at the shear wave transducer at time t1. Next, because of the slower velocity of shear wave 404, a round trip of first shear wave reflection 418 can be received back at the shear wave transducer at time t2. Similarly, subsequent compressional wave reflections can be received back at the shear wave transducer at times t3, t4 and t6, while subsequent shear wave reflections can be received back at the shear wave transducer at times t5 and t7. As shown in the example of FIG. 4B, time window 422 can be determined, empirically or otherwise, to capture the amplitude or energy of first compressional wave reflection 416, and time window 424 can be determined, empirically or otherwise, to capture the amplitude or energy of first shear wave reflection 418. Because no touch is present at sensing plate 410, the amplitude or energy of both first shear wave reflection 418 and first compressional wave reflection 416 can be detected at the shear wave transducer as being above a first threshold 426 and second threshold 428, respectively, as shown in drawing insert 420 in FIG. 4B. Accordingly, no touch may be detected.

Figure 5A:
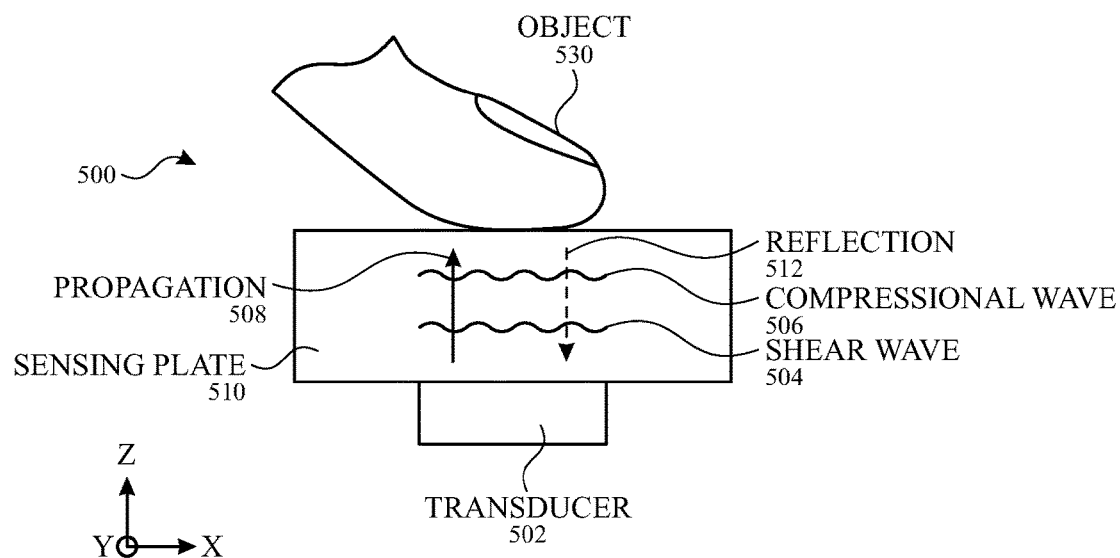
FIG. 5A illustrates a symbolic shear wave transducer implementation with a touching object according to examples of the disclosure.

FIG. 5A illustrates a symbolic shear wave transducer implementation 500 with a touching object according to examples of the disclosure. In the example of FIG. 5A, shear wave transducer 502 generates both shear wave 504 and compressional wave 506 as discussed above, both with a z-axis propagation direction 508. In the presence of object 530 touching sensing plate 510, both shear wave 504 and compressional wave 506 are reflected back to shear wave transducer 502 as shown by reflected wave 512 (symbolically illustrating both separate reflections) with a relatively large drop in amplitude or energy.

Figure 5B:
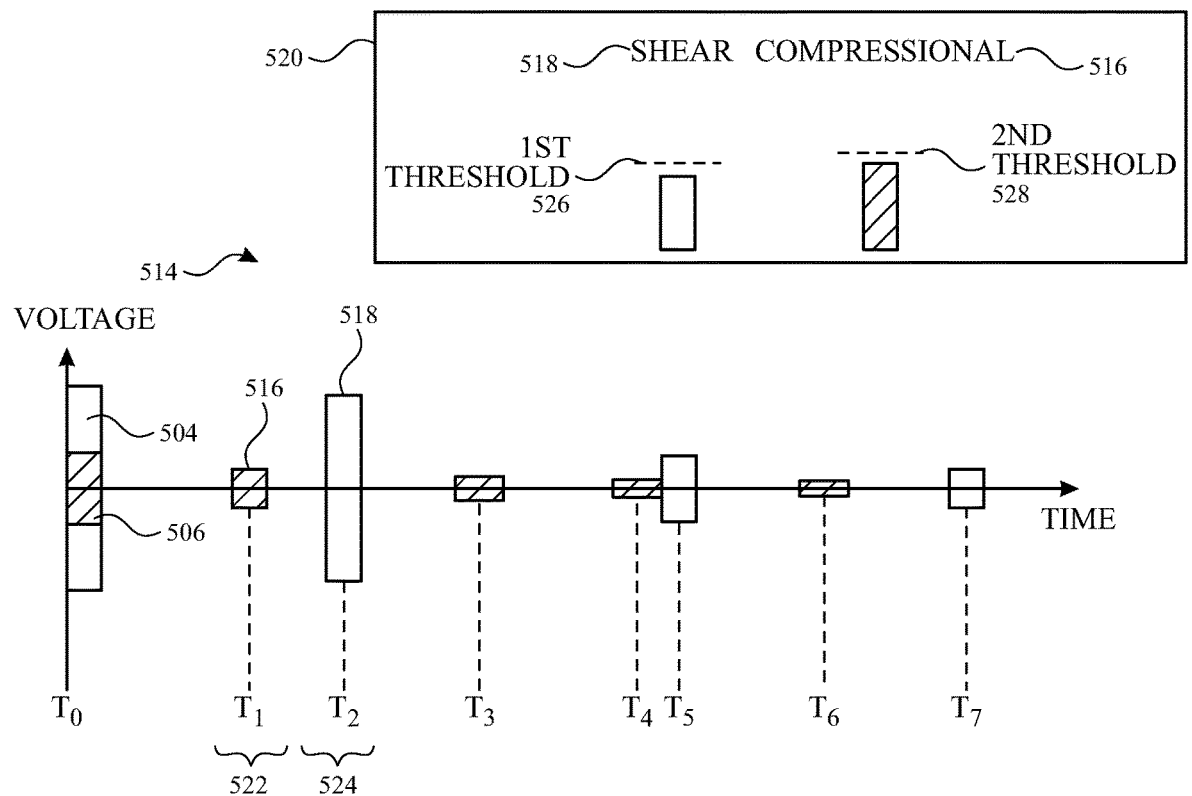
FIG. 5B illustrates a symbolic shear wave transducer reflected wave timing diagram corresponding to the shear wave transducer implementation of FIG. 5A according examples of the disclosure.

FIG. 5B illustrates a symbolic shear wave transducer reflected wave timing diagram 514 corresponding to the shear wave transducer implementation of FIG. 5A according examples of the disclosure. Note that all waves, amplitudes and timing shown in FIG. 5B are symbolic and not to scale. In the example of FIG. 5B, a shear wave transducer can generate both shear wave 504 and compressional wave 506 at time t0, and because of the greater velocity of the compressional wave, a round trip of first compressional wave reflection 516 can be received back at the shear wave transducer at time t1. Next, because of the slower velocity of shear wave 504, a round trip of first shear wave reflection 518 can be received back at the shear wave transducer at time t2. Similarly, subsequent compressional wave reflections can be received back at the shear wave transducer at times t3, t4 and t6, while subsequent shear wave reflections can be received back at the shear wave transducer at times t5 and t7. As shown in the example of FIG. 5B, time window 522 can be determined, empirically or otherwise, to capture the amplitude or energy of first compressional wave reflection 516, and time window 524 can be determined, empirically or otherwise, to capture the amplitude or energy of first shear wave reflection 518. Because touching object 530 is present at sensing plate 510, the amplitude or energy of both first shear wave reflection 518 and first compressional wave reflection 516 can be detected at the shear wave transducer as being below first threshold 526 and second threshold 528, respectively (corresponding to thresholds 426 and 428 in FIG. 4B), as shown in drawing insert 520 in FIG. 5B. Accordingly, a touch may be detected.

Figure 6A:
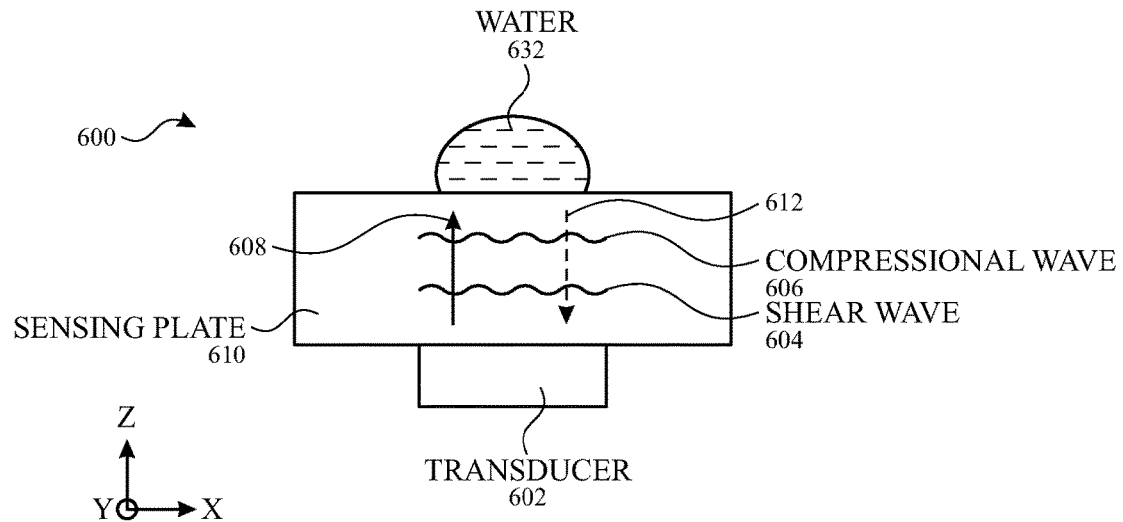
FIG. 6A illustrates a symbolic shear wave transducer implementation with water present according to examples of the disclosure.

FIG. 6A illustrates a symbolic shear wave transducer implementation 600 with water present according to examples of the disclosure. In the example of FIG. 6A, shear wave transducer 602 generates both shear wave 604 and compressional wave 606 as discussed above, both with a z-axis propagation direction 608. In the presence of water 632 touching sensing plate 610, shear wave 604 is reflected back to shear wave transducer 602 as shown by reflected wave 612 (symbolically illustrating both separate reflections) with a relatively small drop in amplitude or energy, while compressional wave 606 is reflected back to the shear wave transducer as shown by reflected wave 612 with a relatively large drop in amplitude or energy.

Figure 6B:
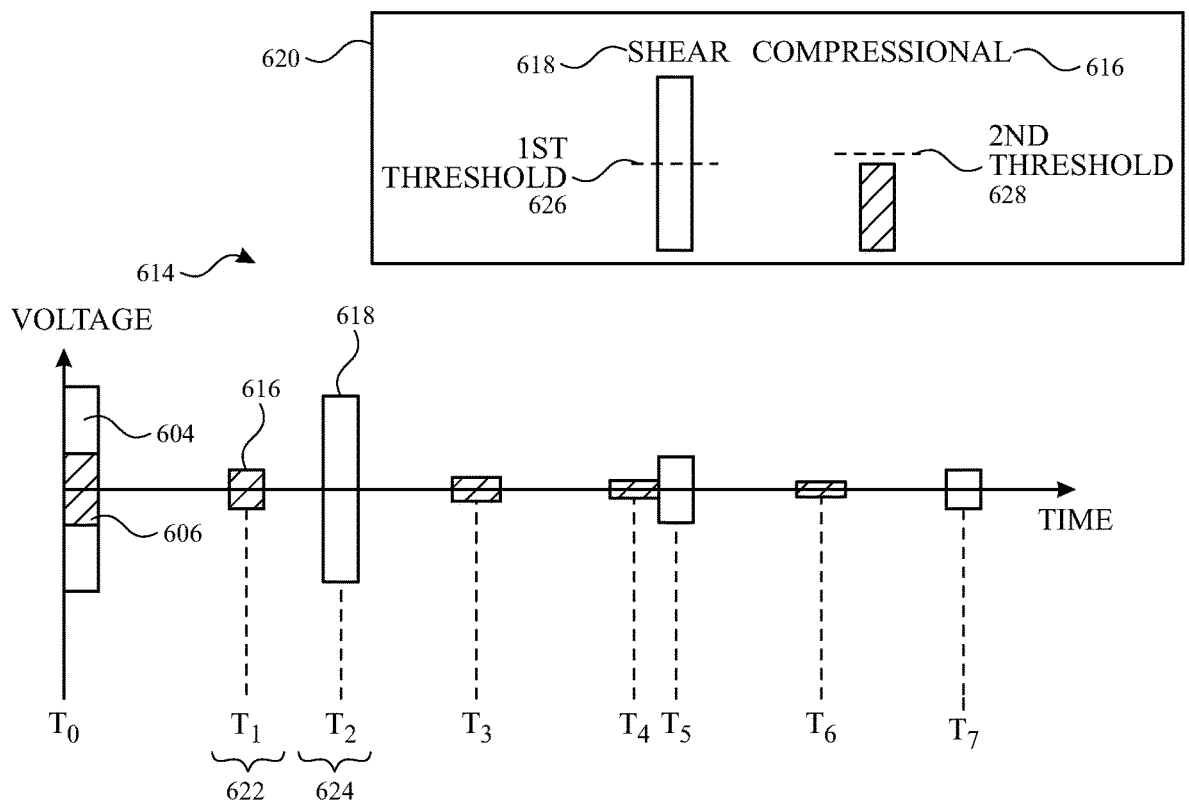
FIG. 6B illustrates a symbolic shear wave transducer reflected wave timing diagram corresponding to the shear wave transducer implementation of FIG. 6A according examples of the disclosure.

FIG. 6B illustrates a symbolic shear wave transducer reflected wave timing diagram 614 corresponding to the shear wave transducer implementation of FIG. 6A according examples of the disclosure. Note that all waves, amplitudes and timing shown in FIG. 6B are symbolic and not to scale. In the example of FIG. 6B, a shear wave transducer can generate both shear wave 604 and compressional wave 606 at time t0, and because of the greater velocity of the compressional wave, a round trip of first compressional wave reflection 616 can be received back at the shear wave transducer at time t1. Next, because of the slower velocity of shear wave 604, a round trip of first shear wave reflection 618 can be received back at the shear wave transducer at time t2. Similarly, subsequent compressional wave reflections can be received back at the shear wave transducer at times t3, t4 and t6, while subsequent shear wave reflections can be received back at the shear wave transducer at times t5 and t7. As shown in the example of FIG. 6B, time window 622 can be determined, empirically or otherwise, to capture the amplitude or energy of first compressional wave reflection 616, and time window 624 can be determined, empirically or otherwise, to capture the amplitude or energy of first shear wave reflection 618. Because water 632 is present at sensing plate 610, the amplitude or energy of first shear wave reflection 618 can be detected at shear wave transducer 602 as being above first threshold 626, and the amplitude or energy of first compressional wave reflection 616 can be detected at shear wave transducer 602 as being below second threshold 628, respectively (corresponding to thresholds 426 and 428 in FIG. 4B), as shown in drawing insert 620 in FIG. 6B. Accordingly, water may be detected.

FIGS. 4A, 4B, 5A, 5B, 6A and 6B show time windows for capturing the first compressional wave reflection and the first shear wave reflection, which are shown with clear time separation (i.e. no overlap). However, as can be seen from the third compressional wave reflection at time t4 and the second shear wave reflection at time t5, the compressional and shear wave reflections do not always have clear time separation, and in some instances the reflections can undesirably overlap. Sensing plate stackups, if any, can also complicate the presence and timing of reflections. For example, if various display layers are present between the shear wave transducer and the sensing plate surface, shear and compressional wave reflections and/or mode conversions can be produced at layer interfaces and other discontinuities, and multiple internal reflections can occur that can make finding appropriate time windows difficult. Examples of the disclosure select one or more of the ultrasonic frequency and shear plate materials and thicknesses to enable a particular compressional wave reflection and a particular shear wave reflection to be identified with sufficient time separation (e.g. no overlap, or minimal overlap between the tails of the shear and compressional waves such that the error resulting from the overlap is below a certain threshold guaranteeing adequate touch detection performance), and because of this time separation, time windows can be identified to separately measure the reflections of both the shear wave and the compressional wave. "Non-overlapping," as used herein, refers to no time overlap, or minimal time overlap such that errors resulting from the overlap are below a certain threshold.

Each material used as a sensing plate has a particular shear and compressional wave velocity at a particular thickness, and this velocity determines when the reflected waves arrive back at the shear wave transducer. In addition, the frequency and bandwidth of the shear and compressional waves determines the time duration of the reflected waves. For example, a low frequency wave over a given number of cycles will have a longer shear and compressional wave reflected pulse duration, which can increase the chance of reflection overlap. Conversely, higher frequency waves over the same number of cycles will have a shorter shear and compressional wave reflected pulse duration, which can decrease the chance of reflection overlap. Thus, consideration of material thickness and frequency can be important considerations in maintaining separation of the shear and compressional wave reflections.

Figure 7A:
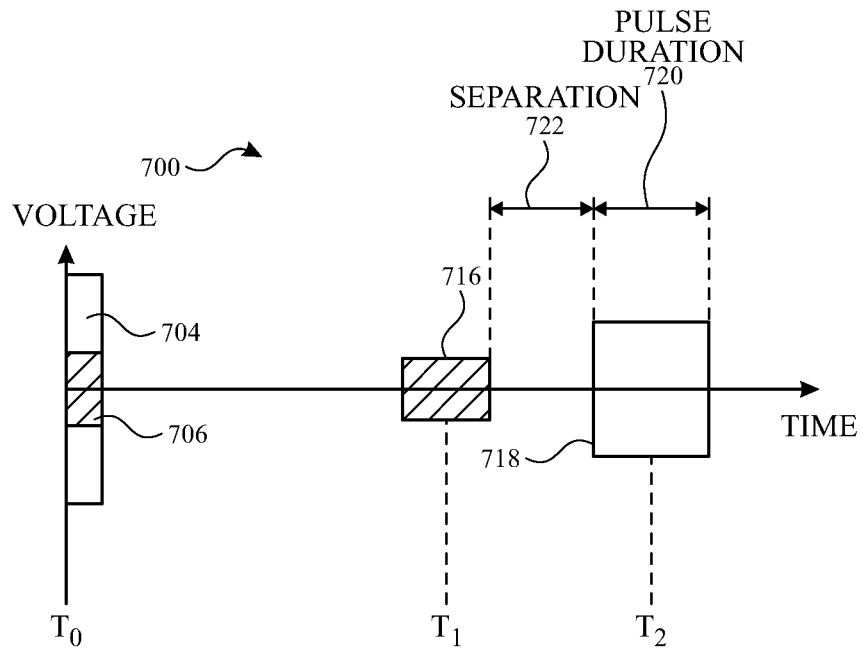
FIG. 7A illustrates a symbolic shear wave transducer reflected wave timing diagram with shear and compressional wave reflections separated in the time domain according examples of the disclosure.

FIG. 7A illustrates a symbolic shear wave transducer reflected wave timing diagram 700 with shear and compressional wave reflections separated in the time domain according examples of the disclosure. Note that all waves, amplitudes and timing shown in FIG. 7A are symbolic and not to scale. In the example of FIG. 7A, a shear wave transducer can generate both shear wave 704 and compressional wave 706 at time t0, and because of the greater velocity of the compressional wave, a round trip of first compressional wave reflection 716 can be received back at the shear wave transducer at time t1. Next, because of the slower velocity of shear wave 704, a round trip of first shear wave reflection 718 can be received back at the shear wave transducer at time t2. In the example of FIG. 7A, the center frequency of the ultrasonic shear wave transducer is 5 MHz, and there are three cycles in each ultrasonic pulse, resulting in a pulse duration 720 of 0.6 µs for shear wave reflection 718. In the example of FIG. 7A, the shear plate is made of glass with a thickness of 15 mm, resulting in a compressional wave velocity of 5.4 mm/µs and a shear wave velocity of 3.4 mm/µs. These velocities result in a compressional wave reflection round trip time t1 of 5.5 µs and a shear wave reflection round trip time t2 of 8.8 µs, ultimately resulting in a separation 722 between the compressional wave reflection and the shear wave reflection of 2.7 µs. With this separation, time windows can be chosen around the compressional wave reflection time of t1=5.5 µs and the shear wave reflection round trip time of t2=8.8 µs to measure these reflections with minimal interference from other reflections.

Figure 7B:
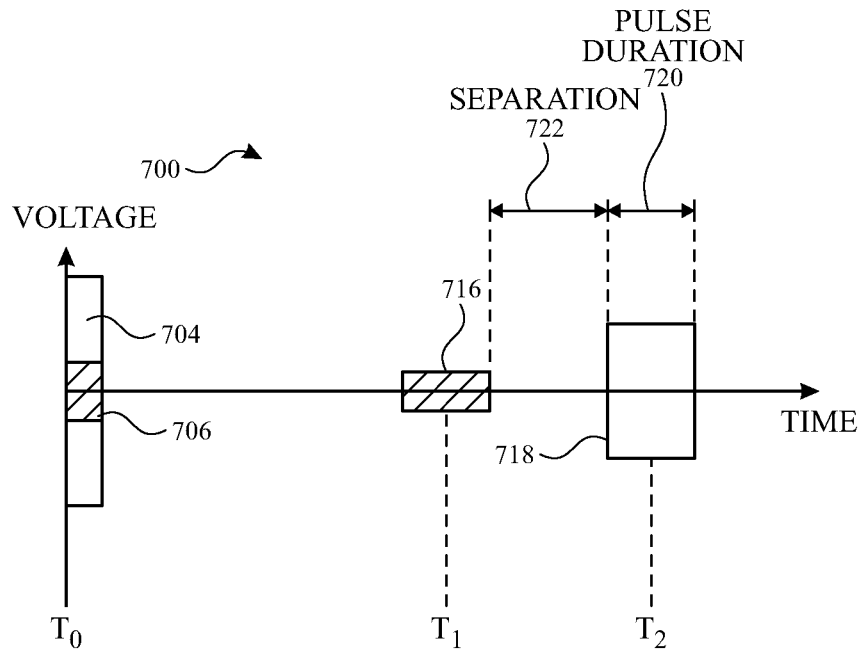
FIG. 7B illustrates another symbolic shear wave transducer reflected wave timing diagram with shear and compressional wave reflections separated in the time domain according examples of the disclosure.

FIG. 7B illustrates another symbolic shear wave transducer reflected wave timing diagram 700 with shear and compressional wave reflections separated in the time domain according examples of the disclosure. Note that all waves, amplitudes and timing shown in FIG. 7B are symbolic and not to scale. FIG. 7B is similar to FIG. 7A except that a lower center frequency is used. In the example of FIG. 7B, the center frequency of the ultrasonic shear wave transducer is 1.5 MHz, resulting in a pulse duration 720 of 2 µs for shear wave reflection 718. Thus, the reflected wave pulse durations in FIG. 7B are longer than the reflected wave pulse durations in FIG. 7A, which in general can increase the chance of reflection overlap. However, in the example of FIG. 7B, there is still a separation 722 between the compressional wave reflection and the shear wave reflection of 1.3 µs. With this separation, smaller time windows (as compared to FIG. 7A) can be chosen around the compressional wave reflection time of t1=5.5 µs and the shear wave reflection round trip time of t2=8.8 µs to measure these reflections with minimal interference from other reflections.

The examples of FIGS. 7A and 7B illustrate the general concept that the choice of ultrasonic stimulation frequency and the number of cycles in each ultrasonic pulse can serve to increase or decrease the reflected wave durations, resulting in shorter or longer time separations between reflected shear and compressional wave reflections.

Figure 8A:
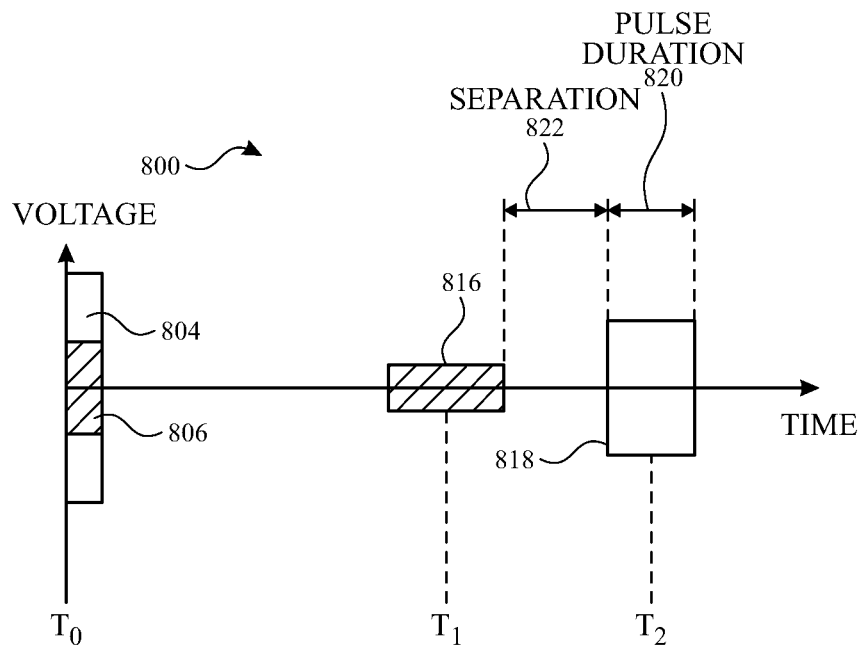
FIG. 8A illustrates yet another symbolic shear wave transducer reflected wave timing diagram with shear and compressional wave reflections separated in the time domain according examples of the disclosure.

FIG. 8A illustrates yet another symbolic shear wave transducer reflected wave timing diagram 800 with shear and compressional wave reflections separated in the time domain according examples of the disclosure. Note that all waves, amplitudes and timing shown in FIG. 8A are symbolic and not to scale. In the example of FIG. 8A, a shear wave transducer can generate both shear wave 804 and compressional wave 806 at time t0, and because of the greater velocity of the compressional wave, a first round trip of compressional wave reflection 816 can be received back at the shear wave transducer at time t1. Next, because of the slower velocity of shear wave 804, a first round trip of shear wave reflection 818 can be received back at the shear wave transducer at time t2. In the example of FIG. 8A, the center frequency of the ultrasonic shear wave transducer is 1.5 MHz, and there are three cycles in each ultrasonic pulse, resulting in a pulse duration 820 of 2 µs for shear wave reflection 718. In the example of FIG. 8A, the shear plate is made of glass with a thickness of 15 mm, resulting in a compressional wave velocity of 5.4 mm/µs and a shear wave velocity of 3.4 mm/µs. These velocities result in a compressional wave reflection round trip time t1 of 5.5 µs and a shear wave reflection round trip time t2 of 8.8 µs, ultimately resulting in a separation 822 between the compressional wave reflection and the shear wave reflection of 1.3 µs. With this separation, time windows can be chosen around the compressional wave reflection time of t1=5.5 µs and the shear wave reflection round trip time of t2=8.8 µs to measure these reflections with minimal interference from other reflections.

Figure 8B:
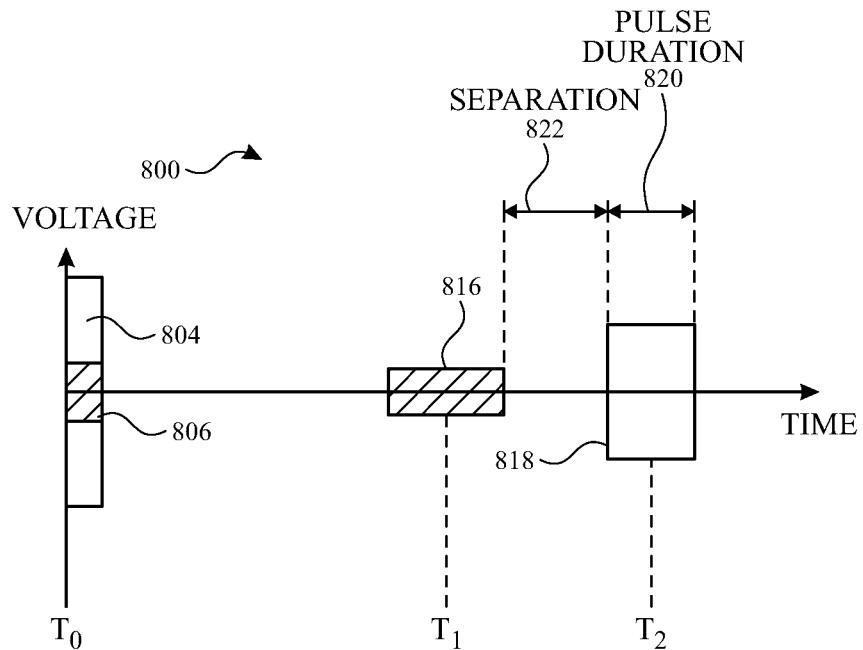
FIG. 8B illustrates yet another symbolic shear wave transducer reflected wave timing diagram with shear and compressional wave reflections separated in the time domain according examples of the disclosure.

FIG. 8B illustrates yet another symbolic shear wave transducer reflected wave timing diagram 800 with shear and compressional wave reflections separated in the time domain according examples of the disclosure. Note that all waves, amplitudes and timing shown in FIG. 8B are symbolic and not to scale. FIG. 8B is similar to FIG. 8A except that a thinner glass plate is used, necessitating the use of a higher center frequency in order to maintain adequate reflection separation. In the example of FIG. 8B, the shear plate is made of glass with a thickness of 1.5 mm, and the center frequency of the ultrasonic shear wave transducer is 15 MHz. The thinner sensing plate combined with the higher center frequency results in a compressional wave reflection round trip time t1 of only 0.55 µs and a shear wave reflection round trip time t2 of only 0.88 µs, which in general can reduce the reflection separation time. However, the higher center frequency also results in a pulse duration 820 of only 0.2 µs for shear wave reflection 818. Thus, the reflected wave pulse durations in FIG. 8B are shorter than the reflected wave pulse durations in FIG. 8A, which in general can decrease the chance of reflection overlap. In the example of FIG. 8B, there is still a separation between the compressional wave reflection and the shear wave reflection 822 of 0.13 µs. With this separation, smaller time windows (as compared to FIG. 8A) can be chosen around the compressional wave reflection time of t1=0.55 µs and the shear wave reflection round trip time of t2=0.88 µs to measure these reflections with minimal interference from other reflections.

The examples of FIGS. 8A and 8B illustrate the general concept that as thinner sensing plates are utilized, resulting in shorter reflection times as more closely spaced shear and compressional wave reflections, examples of the disclosure can compensate by increasing the center frequency of the ultrasonic shear wave transducer to shorten the reflection pulse width and maintain shear and compressional wave time separation. More generally, a given sensing plate material can result in a characteristic ultrasonic compressional wave velocity and a characteristic ultrasonic shear wave velocity. The thickness of that material can be selected to determine a round trip reflection distance and also the timing of the shear and compressional wave reflections (because of their known velocities). The material, and thickness of that material, can therefore be selected such that a first reflection from the ultrasonic shear wave received at a particular transducer is non-overlapping in time with respect to a first reflection from the ultrasonic compressional wave received at the particular transducer.

The examples of FIGS. 7A, 7B, 8A and 8B therefore illustrate that by careful selection of sensing plate thickness and ultrasonic shear wave transducer frequency, time durations between compressional wave and shear wave reflections can be obtained to enable the determination of time windows, within which the amplitude or energy of a shear wave reflection and a compressional wave reflection can be determined without significant interference from other reflections. These amplitudes or energy levels can then be used to determine whether a touch is present and whether water is present.

The previous examples discussed hereinabove have all utilized the first shear wave reflection and the second shear wave reflection to determine reflection amplitudes or energy levels and the presence of a touch or water. In some examples, first reflections can be advantageous because there are no other reflections or ringing occurring at that time (e.g., spurious waves from the transducer than interact with other objects or interfaces and reflect back to the transducer). Utilizing reflections other than the first reflections can also result in attenuated signals, because with two or more round trip reflections, the waves have interacted with multiple surfaces, interfaces and other imperfections due to diffraction.

However, in some examples using the second or third reflections (or other subsequent reflections) can be beneficial. These reflections can have more sensitivity to a touching object or water because they will have interacted with the top surface of the sensing plate multiple times, resulting in additional wave absorption by the object or water (depending on the type of wave). In addition, using downstream reflections can be beneficial for thin stackups, because in such configurations the first reflections can arrive very quickly, when the transducer electronics may still be ringing from transmitting, which can make those first reflections hard to discern. However, as noted above, finding time periods to measure these downstream reflections without corruption from other reflections can be difficult.

In examples of the disclosure, the sensing plate can be formed from glass, sapphire crystal, plastic and metal, among other materials. A key criteria of the material can be how much attenuation of the ultrasonic wave will result.

Although examples of the disclosure presented hereinabove have illustrated only a single ultrasonic shear wave transducer, in other examples of the disclosure an array of ultrasonic shear wave transducers can be employed to not only determine the presence of a touch or water, but also to determine a location of the touch or water over larger surfaces.

Figure 9:
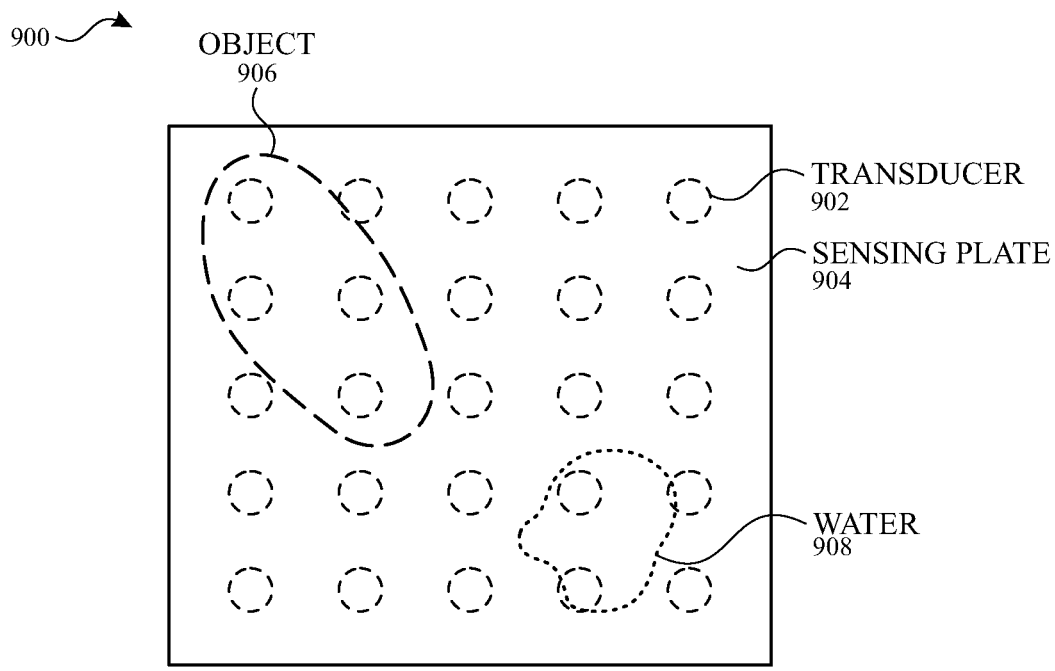
FIG. 9 illustrates a symbolic plan view of a touch-sensitive surface including an array of ultrasonic shear wave transducers according to examples of the disclosure.

FIG. 9 illustrates a symbolic plan view of a touch-sensitive surface 900 including an array of ultrasonic shear wave transducers 902 according to examples of the disclosure. In the example of FIG. 9, ultrasonic shear wave transducers 902 are located under sensing plate 904. Ultrasonic shear wave transducers 902 located under touching object 906 can detect the presence of the object using the shear and compressional wave reflections described above. Furthermore, the known locations of those ultrasonic shear wave transducers 902 that detect the presence of object 906 can further be used to calculate a location (e.g., a centroid) of the object and estimate touch boundaries of the object. Similarly, ultrasonic shear wave transducers 902 located under water droplet 908 can detect the presence of the droplet using the shear and compressional wave reflections described above. Furthermore, the known locations of those ultrasonic shear wave transducers 902 that detect the presence of droplet 908 can further be used to calculate a location (e.g., a centroid) of the droplet and estimate boundaries of the droplet.

Figure 10:
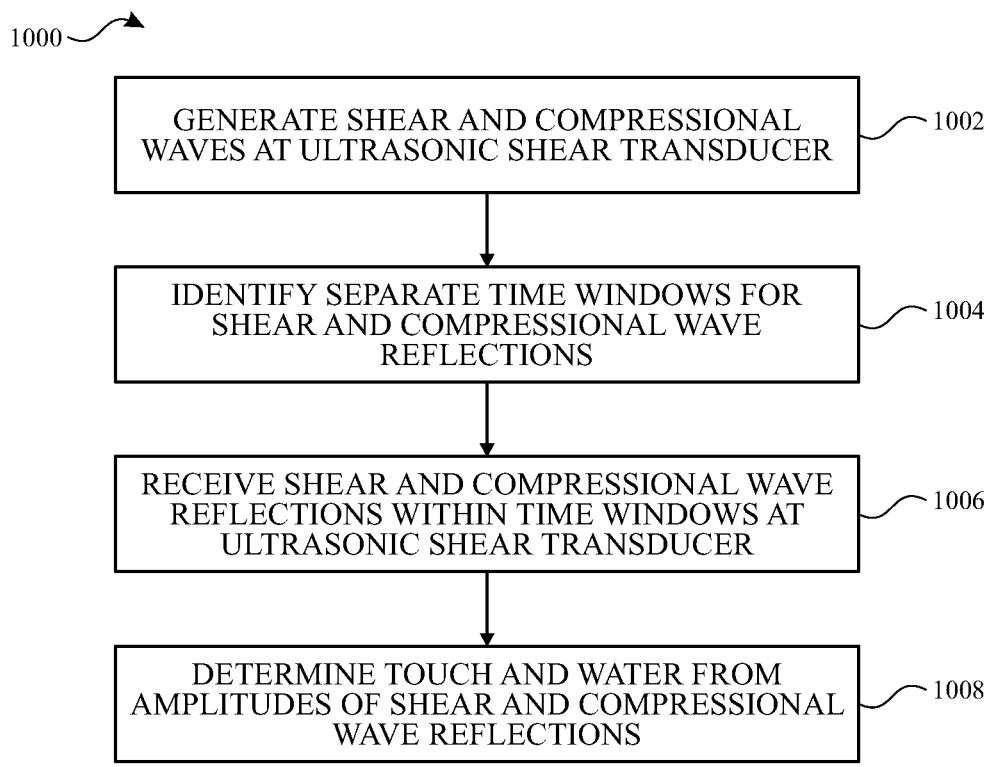
FIG. 10 illustrates a flowchart for ultrasonic water agnostic touch detection according to examples of the disclosure.

FIG. 10 illustrates flowchart 1000 for ultrasonic water-agnostic touch detection according to examples of the disclosure. In the example of FIG. 10, at 1002 shear and compressional waves are generated by an ultrasonic shear wave transducer and propagated through a sensing plate. At 1004, separate time windows for receiving shear wave reflections and compressional wave reflections are identified. At 1006, the shear wave reflections and compressional wave reflections are received at the ultrasonic shear wave transducer. At 1008, the presence or absence of a touch, and the presence of water (if any) can be determined based on the amplitudes or energy levels of the received shear wave and compressional wave reflections.

The preceding examples utilized an ultrasonic shear transducer to propagate shear waves and parasitic compressional waves having a particular stimulation center frequency and spectrum through a sensing plate of a particular material type and thickness in order to separate the reflections of those waves. By measuring the amplitudes of the reflected shear waves and reflected parasitic compressional waves, it can be determined whether an object or a liquid is present on the sensing plate. However, in other examples of the disclosure described below, a plurality of ultrasonic transducers can be utilized to generate both shear and compressional non-propagating (standing) waves, each at a different resonant frequency, within the sensing plate. By measuring the amplitudes of the shear and compressional waves (i.e., their energy levels) as they resonate within the sensing plate, it can be determined whether an object or a liquid is present on the sensing plate. The functional blocks of FIG. 2 can be utilized to implement the examples of the disclosure described below.

FIGS. 11A-11C illustrates the primary layers of an ultrasonic transducer array according to examples of the disclosure. FIG. 11A illustrates first conductive material layer 1132 for exciting piezoelectric material according to examples of the disclosure. In the example of FIG. 11A, first conductive material layer 1132 can be formed on a back side of a sensing plate and patterned as row electrodes. In situations where transparency is required, such as when ultrasonic sensing is utilized over a display to form a touch screen, first conductive material layer 1132 can be a transparent conductive material such as Indium Tin Oxide (ITO), for example. FIG. 11B illustrates piezo material layer 1134 for generating ultrasonic compressional and shear waves according to examples of the disclosure. In the example of FIG. 11B, piezo material layer 1134 can be formed on first conductive material layer 1132. In situations where at least partial transparency is required, piezo material layer 1134 can be an at least partially transparent piezo material such as aluminum nitride or zinc oxide, for example. FIG. 11C illustrates second conductive material layer 1136 for exciting piezoelectric material according to examples of the disclosure. In the example of FIG. 11C, second conductive material layer 1136 can be formed on piezo material layer 1134 and patterned as column electrodes. In situations where transparency is required, second conductive material layer 1136 can be Indium Tin Oxide (ITO), for example.

Figure 11D:
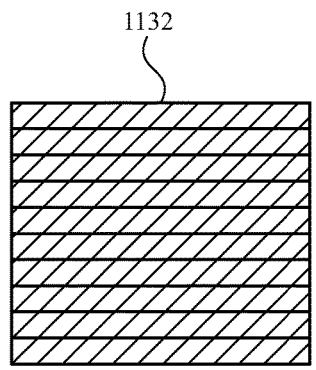
FIG. 11D illustrates a plan view of a stackup of the layers of FIGS. 11A-11C according to examples of the disclosure.
Figure 11D:
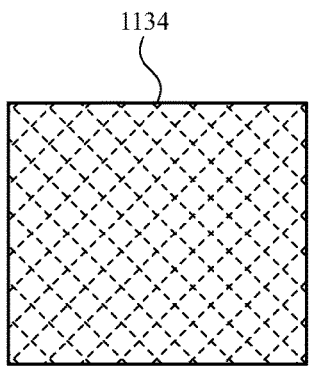
Figure 11D:
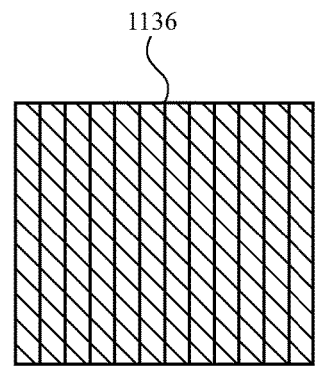
Figure 11D:
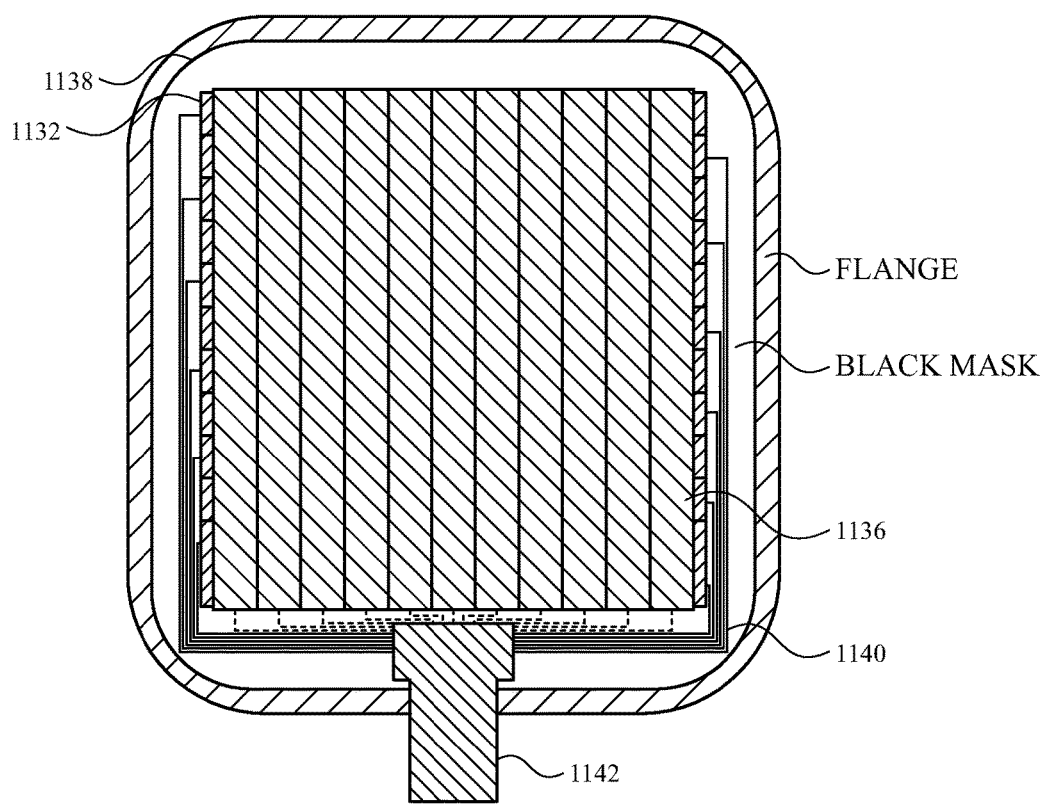

FIG. 11D illustrates a plan view of a stackup of the layers of FIGS. 11A-11C according to examples of the disclosure. In the example of FIG. 11D, first conductive material layer 1132 can be formed on a back side of sensing plate 1138, whose edges can optionally be coated with a black mask and terminate with a flange. The piezo layer (not shown) can be formed on first conductive material layer 1132, and second conductive material layer 1136 can be formed on the piezo layer. It should be understood that the stackup can include adhesive layers and index matching layers, which are not shown. First conductive material layer 1132 and second conductive material layer 1136 can be electrically connected to routing traces 1140, which can be formed from low resistance, high conductivity material such as copper when routed in the black mask area. Routing traces 1140 can be routed to flex circuit 1142. These routing traces 1140 can be utilized to apply AC excitation signals across a particular row of first conductive material layer 1132 and a particular column of second conductive material layer 1136 to cause piezo material 1134 located at the intersection of that row and column to operate as an ultrasonic transmitter and generate shear or compressional waves at that intersection. In addition, routing traces 1140 can be utilized to detect voltages across a particular row of first conductive material layer 1132 and a particular column of second conductive material layer 1136 when piezo material 1134 located at the intersection of that row and column operates as an ultrasonic receiver. In other words, at each intersection of the rows and columns, an ultrasonic transducer can be activated as a transmitter or receiver, forming a two-dimensional array of ultrasonic transducers.

Although the stackup of FIG. 11D illustrates first conductive material layer 1132 and second conductive material layer 1136 in a row/column arrangement, it should be understood that the terms "row" and "column" can be used interchangeably herein, and are intended to describe a generally orthogonal arrangement. In addition, transducer arrangements other than row/column are also contemplated herein, such as polar coordinate transducer arrangements and pixelated transducer arrangements where each transducer can be individually excited. Furthermore, in some examples the ultrasonic transducers can be selectively and dynamically reconfigured as capacitive touch sensing arrangements, with first and second conductive material layers 1132 and 1136 serving as mutual capacitance drive and sense electrodes, or as self-capacitance electrodes, if separated by an appropriate dielectric material that is also ultrasonically transparent. Selectively providing capacitive touch sensing can enable the additional capability of proximity (hover) sensing.

Figure 12A:
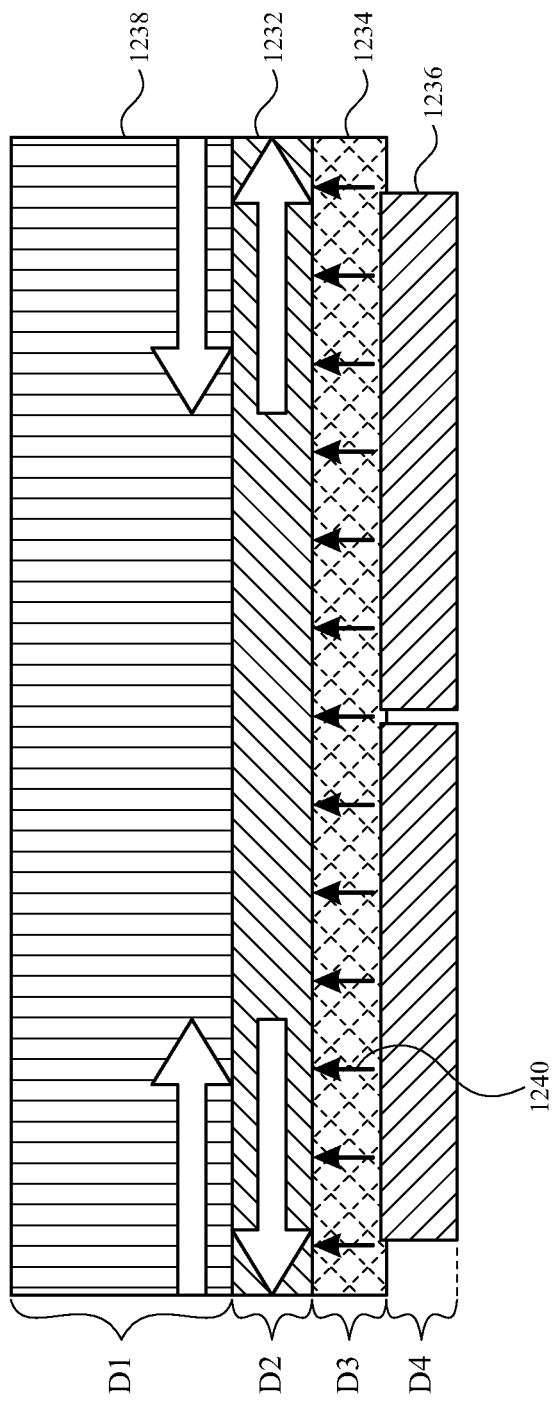
FIG. 12A illustrates a cross-sectional view of two ultrasonic transducers in the array of FIG. 11D according to examples of the disclosure.

FIG. 12A illustrates a cross-sectional view of two ultrasonic transducers in the array of FIG. 11D according to examples of the disclosure. In the example of FIG. 12A, piezo material 1234 (e.g., aluminum nitride, zinc oxide, etc.) having polling direction 1240 can be sandwiched between a row electrode in first conductive material layer 1232 and two column electrodes in second conductive material layer 1236. The row electrode can be formed on sensing plate 1238 (e.g., front crystal glass or other material that is a good resonator). As will be explained in further detail below, to generate resonating shear waves within sensing plate 1238 having a particular thickness, the row electrode and both column electrodes can receive AC excitation voltages at a frequency that produces a lateral (shear) displacement in piezo material 1234 sufficient to generate shear waves at a shear wave resonant frequency of sensing plate 1238. Although a compressional displacement can also be generated (mostly because of the Poisson effect) at the same time, because the shear wave excitation frequency is far from the compressional wave resonant frequency of sensing plate 1238 (e.g., 0.5 GHz), minimal compressional waves can be generated. To generate resonating compressional waves within sensing plate 1238 having a particular thickness, the row electrode and each column electrode can receive AC excitation voltages at a frequency that produces a compressional displacement in piezo material 1234 sufficient to generate compressional waves at a compressional resonant frequency of sensing plate 1238.

For a given stackup of materials and thicknesses as shown generally in FIG. 12A, a shear wave resonant frequency and a different compressional wave resonant frequency for sensing plate 1238 can be determined to produce non-propagating resonant waves within the sensing plate. Non-propagating waves can be desirable to constrain the energy of the waves to be within a certain area of sensing plate 1238 and maintain a higher signal-to-noise ratio (SNR). If the frequencies were chosen such that the shear and compressional waves were able to propagate horizontally along sensing plate 1238, the propagating waves could reflect off the ends of the plate back to the transducer(s) and cause an undesired baseline energy level shift. To avoid this, in some examples a shear wave resonant frequency can be determined empirically by selecting a particular frequency of a shear horizontal (SH) wave mode that produces a near-zero group velocity (i.e., a non-propagating shear wave). Similarly, a compressional wave resonant frequency can be determined empirically by selecting a particular frequency of a symmetric (S) or asymmetric (A) mode of a particular order (e.g., first order Lamb waves) that produces a near-zero group velocity (i.e., a non-propagating compressional wave).

In the previous examples of propagating shear and compressional waves discussed with respect to FIG. 8B above, it was noted that thinner sensing plates required higher transducer center frequencies to maintain adequate reflection separation. The present examples that utilize non-propagating shear and compressional waves can also benefit from thinner sensing plates, but higher frequencies become more problematic in the examples of FIGS. 11A-11D, where high resistance ITO may be utilized in forming the ultrasonic transducers to provide desired transparency. The higher resistance of the ITO can filter out high frequency content. Therefore, it can be desirable to select shear or compressional waves that are low in frequency, and also produce a near-zero group velocity (i.e., are non-propagating).

In general, for a given sensing plate material and thickness, a frequency of shear resonance in the sensing plate can be determined (e.g., empirically) to provide a non-propagating standing wave in the sensing plate appropriate for shear imaging. Similarly, for the given sensing plate material and thickness, a frequency of compressional resonance can be determined (e.g., empirically) to provide a non-propagating standing wave of maximum amplitude inside the transducer area for compressional imaging. In addition, theoretical calculations can be utilized to identify the non-propagating shear and compressional waves, if the mechanical properties of all layers in the stackup are known. When the mechanical properties are known, shear horizontal and Lamb guided wave dispersion curves can be calculated, and modes at frequencies with near-zero group velocities can be selected.

Figure 12B:
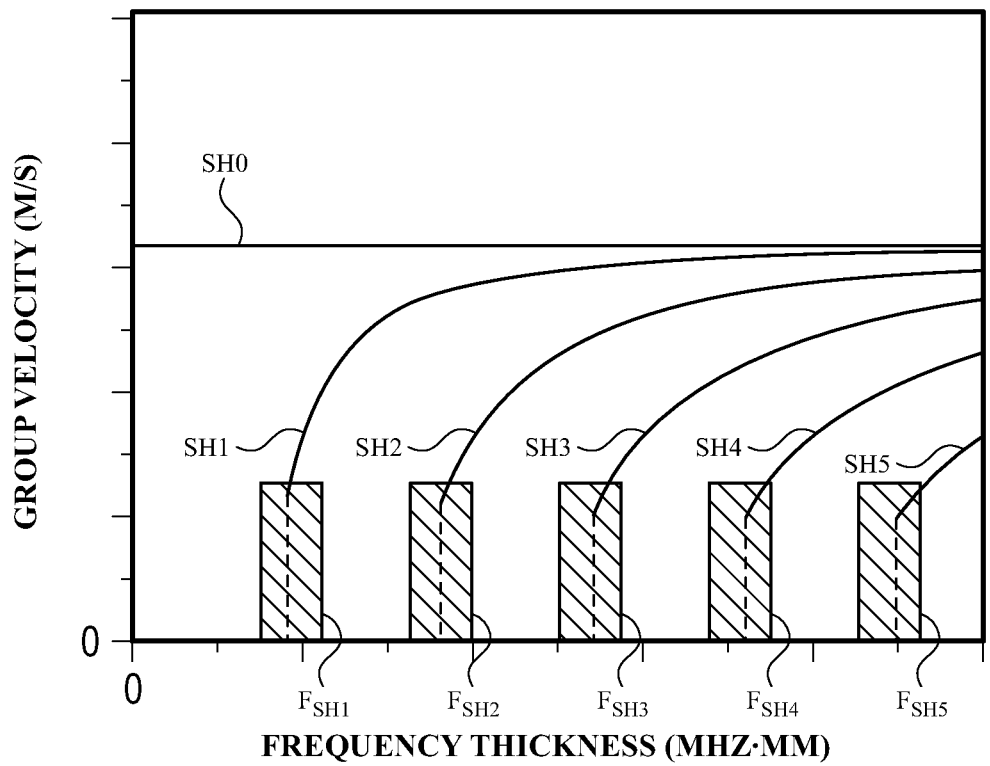
FIG. 12B illustrates example shear horizontal dispersion curves for the selection of non-propagating shear waves according to examples of the disclosure.

FIG. 12B illustrates example shear horizontal dispersion curves for the selection of non-propagating shear waves according to examples of the disclosure. In the example of FIG. 12B, shear horizontal dispersion curves for first through fifth non-propagating shear horizontal waves SH1-SH5 are plotted over various frequencies for a given material thickness (x-axis). For curves SH1-SH5, it can be seen that the group velocity (y-axis) approaches zero at frequency ranges $f_{SH1}$ through $f_{SH5}$, respectively. In one example, the first mode SH1 and a frequency of shear resonance within the frequency range $f_{SH1}$ can be selected to produce a near-zero group velocity in view of the high resistance of ITO discussed above.

Figure 12C:
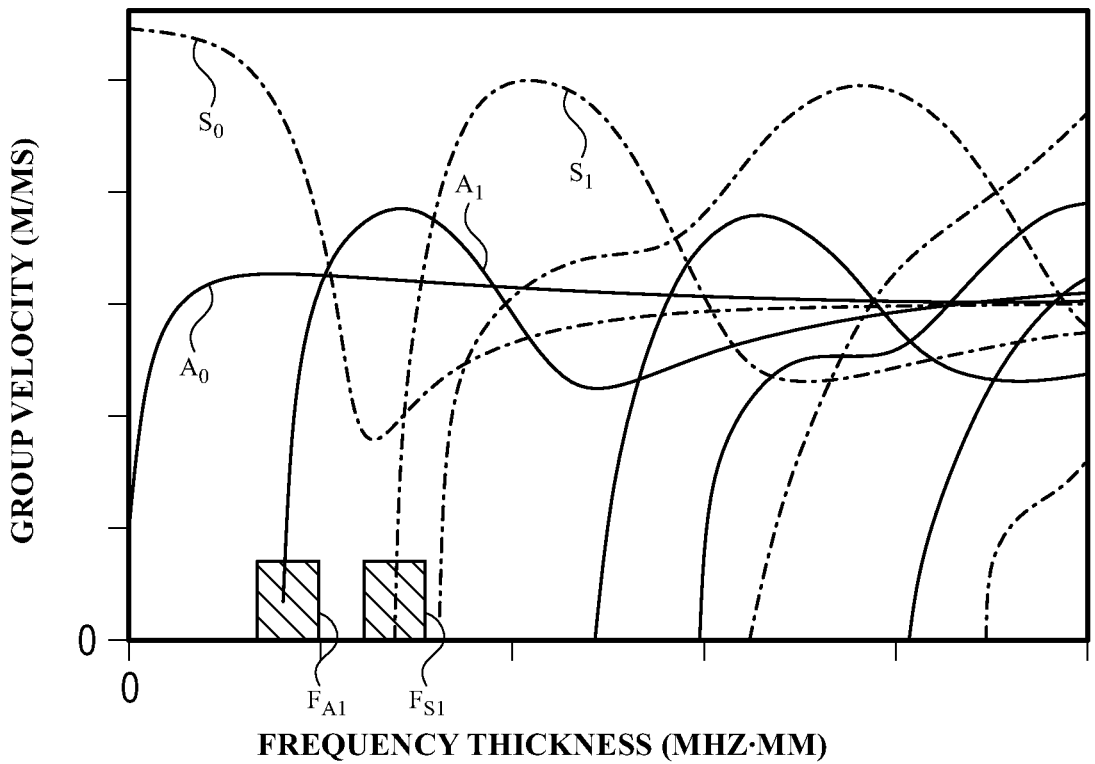
FIG. 12C illustrates example Lamb/compressional dispersion curves for the selection of non-propagating compressional waves according to examples of the disclosure.

FIG. 12C illustrates example Lamb/compressional dispersion curves for the selection of non-propagating compressional waves according to examples of the disclosure. In the example of FIG. 12C, Lamb/compressional dispersion curves for symmetrical zero and first order modes $S_0$ and $S_1$, and antisymmetrical zero and first order modes $A_0$ and $A_1$, are plotted over various frequencies for a given material thickness (x-axis). For curves $A_1$ and $S_1$, it can be seen that the group velocity (x-axis) approaches zero at frequency ranges $f_{A1}$ and $f_{S1}$, respectively. In one example, antisymmetrical first order mode $A_1$ and a frequency of compressional resonance within the frequency range $f_{A1}$ can be selected to produce a near-zero group velocity in view of the high resistance of ITO discussed above.

In some examples, sensing plate 1238 can be formed from front crystal (e.g., glass) material having a thickness of d1=500 microns, first conductive material layer 1232 can have a thickness of d2=0.2 microns, piezo material 1234 can have a thickness of d3=2 microns, and second conductive material layer 1236 can have a thickness of d4=0.2 microns. With these dimensions, a shear wave resonant frequency of about 3 MHz (e.g., 3.28 MHz) and a compressional wave resonant frequency of about 5 MHz (e.g., 5.2 MHz) can be selected. As compared to the broader-band frequencies of the propagating shear and compressional waves generated in earlier examples, these shear and compressional wave resonant frequencies can be much more narrowband (e.g., fractional bandwidth of about 1-5%). Pairs of transducers can be driven with a 3.28 MHz excitation signal to generate resonant shear waves within sensing plate 1238, and the amplitude of the resonating shear waves can be captured for use in determining whether an object or liquid (or neither) is present on the sensing plate. At a different time, each transducer can be driven with a 5.2 MHz excitation signal to generate resonant compressional waves within sensing plate 1238, and the amplitude of the resonating compressional waves can be captured for use in determining (along with the amplitudes of the resonant shear waves) whether an object or liquid (or neither) is present on the sensing plate.

Figure 13A:
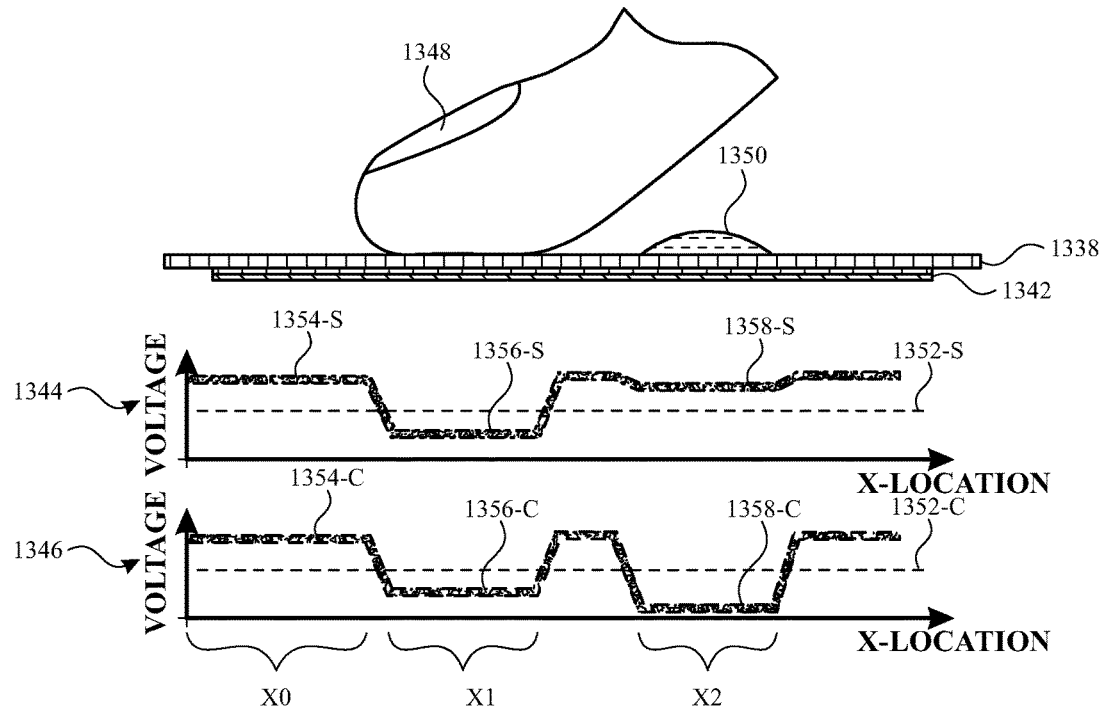
FIG. 13A illustrates the concept of non-propagating shear and compressional wave imaging according to examples of the disclosure.

FIG. 13A illustrates the concept of non-propagating shear and compressional wave imaging according to examples of the disclosure. In the example of FIG. 13A, the first conductive material layer, the piezo material layer, and the second conductive material layer are shown collectively as transducer layer 1342, which is affixed to the back of sensing plate 1338. Plot 1344 represents the amplitude (energy level) of shear waves resonating within sensing plate 1338, as detected by transducers configured as receivers (to be discussed in greater detail below). Plot 1346 represents the amplitude (energy level) of compressional waves resonating within sensing plate 1338, as detected by transducers configured as receivers (to be discussed in greater detail below). When no object 1348 (e.g., a finger) or liquid 1350 (e.g., water) is in contact with sensing plate 1338, as shown at location x0, the amplitudes of both the shear and compressional waves can be maintained at (relatively) high voltage levels 1354-S and 1354-C, respectively, which are above shear and compressional wave threshold voltage level 1352-S and 1352-C, respectively. When object 1348 contacts sensing plate 1338, as shown at location x1, the object can absorb some of the energy of the resonating shear and compressional waves, and as a result the amplitudes of both the shear and compressional waves can fall to (relatively) low voltage levels 1356-S and 1356-C, respectively, which are below shear and compressional wave threshold voltage levels 1352-S and 1352-C, respectively. When liquid 1350 contacts sensing plate 1338, as shown at location x2, the liquid can absorb some of the energy of the resonating compressional waves, and as a result the amplitude of the compressional waves can fall to (relatively) low voltage level 1358-C, which is below compressional wave threshold voltage level 1352-C. However, liquid 1350 may not absorb much of the energy of the resonating shear wave, and as a result the amplitude of the shear waves can be reduced only a small amount to 1358-S, remaining above shear wave threshold voltage level 1352-S. In some examples, the shear wave amplitudes by themselves can be utilized to determine whether no object 1348 or liquid 1350 is present, an object is present, or a liquid is present. However, in other examples, by comparing the amplitudes of both the shear and compressional waves to threshold voltage levels 1352-S and 1352-C at the same transducer location, a more reliable determination can be made as to whether no object 1348 or liquid 1350 is present, an object is present, or a liquid is present. Although FIG. 13A illustrates only one shear wave threshold 1352-S and one compressional wave threshold 1352-C, in other examples multiple shear wave thresholds and/or multiple compressional wave thresholds may be employed to ensure that the energy levels are high or low enough to be identified with confidence.

To compare the shear image shown in plot 1344 and the compressional image shown in plot 1346 at each ultrasonic transducer location in a two-dimensional array of ultrasonic transducers along the surface of sensing plate 1338, two images can be captured. A shear image can be captured by obtaining shear wave amplitude information at each transducer in the two-dimensional array, and a compressional image can be captured by obtaining compressional wave amplitude information at each transducer in the two-dimensional array. In some examples, a complete shear wave image can be captured, followed by a complete compressional wave image, or vice versa. However, if a certain frame rate (e.g., 60 Hz) is desired, the separate capture of shear and compressional images might not be practical. In other examples, to take advantage of efficiencies in transducer addressing, configuration and excitation, a shear image and a compressional image may be obtained at one transducer at the two different shear and compressional resonant frequencies before moving on to the next transducer, or a shear image and a compressional image along a single row (or column) of transducers can be obtained before moving on to the next row (or column).

Figure 13B:
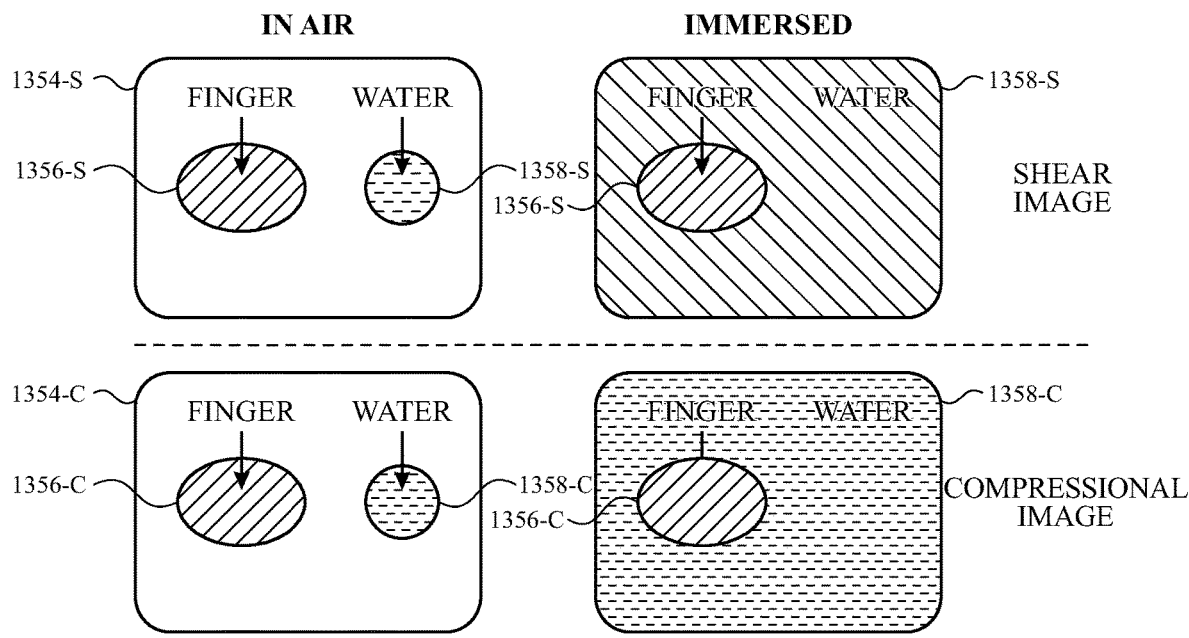
FIG. 13B illustrates a symbolic plan view of non-propagating shear and compressional wave imaging according to examples of the disclosure.

FIG. 13B illustrates a symbolic plan view of non-propagating shear and compressional wave imaging according to examples of the disclosure. In each of the four examples provided in FIG. 13B, an object and liquid are touching a sensing plate. In the upper left example, a shear wave is resonating within the sensing plate, and areas of the sensing plate where no object or liquid is present can produce a shear wave amplitude of 1354-S. At the location of the touching object, a shear wave amplitude of 1356-S can be produced, and at the location of liquid, a shear wave amplitude of 1358-S can be produced. In the lower left example, a compressional wave is resonating within the sensing plate, and areas of the sensing plate where no object or liquid is present can produce a compressional wave amplitude of 1354-C. At the location of the touching object, a compressional wave amplitude of 1356-C can be produced, and at the location of liquid, a compressional wave amplitude of 1358-C can be produced. If both the area of the touching object in the shear image (where a shear wave amplitude of 1356-S is produced) and the area of the touching object in the compressional image (where a compressional wave amplitude of 1356-C is produced) is larger than what would be expected from a finger or thumb, in some examples a palm touch can be detected. In the upper right example, a shear wave is resonating within the sensing plate, and the entire sensing plate is submerged in the liquid. Areas of the sensing plate where no object is present can produce a shear wave amplitude of 1358-S. At the location of the touching object, a shear wave amplitude of 1356-S can be produced. In the lower right example, a compressional wave is resonating within the sensing plate, and the entire sensing plate is submerged in the liquid. Areas of the sensing plate where no object is present can produce a compressional wave amplitude of 1358-C. At the location of the touching object, a compressional wave amplitude of 1356-C can be produced.

In some examples, the areas of the sensing plate where no object or liquid is present can be utilized to determine whether the sensing plate is immersed in liquid. For example, if a predetermined area of the sensing plate (larger than would be expected for a touching finger or liquid droplet) is determined to have a shear wave amplitude of 1354-S and a compressional wave amplitude of 1354-C, it can be further determined that the sensing plate is in air. On the other hand, if the predetermined area of the sensing plate is determined to have a shear wave amplitude of 1358-S and a compressional wave amplitude of 1358-C, it can be further determined that the sensing plate is immersed in liquid. Although not shown in FIG. 13B, if the predetermined area of the sensing plate is determined to have a shear wave amplitude of 1356-S and a compressional wave amplitude of 1356-C, it can be further determined that a large object (e.g., palm, cheek, etc.) is touching the sensing plate. These further determinations can be used in various algorithms to trigger further functions and operations, for example.

Figure 14A:
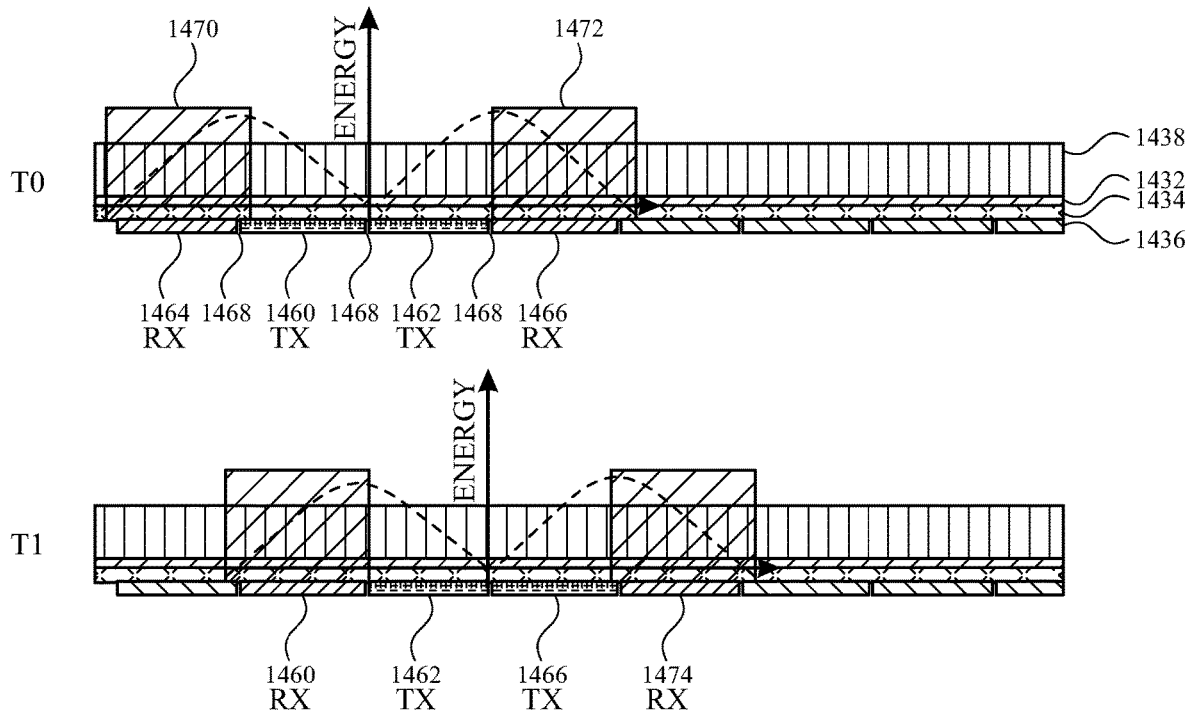
FIG. 14A illustrates a cross-sectional view of shear wave generation and detection using separate transducers according to examples of the disclosure.

FIG. 14A illustrates a cross-sectional view of shear wave generation and detection using separate transducers according to examples of the disclosure. In the example of FIG. 14A, piezo material 1434 (e.g., aluminum nitride, zinc oxide, etc.) can be sandwiched between row electrodes in first conductive material layer 1432 and column electrodes in second conductive material layer 1436. First conductive material layer 1432 can be formed on sensing plate 1438 (e.g., front crystal glass or other material that is a good resonator). At time period t0 (upper cross-sectional view), a single row electrode in first conductive material layer 1432 and two adjacent column electrodes 1460 and 1462 in second conductive material layer 1436 can be configured as an ultrasonic transmitter and driven with AC excitation signals to generate resonant shear waves in sensing plate 1438. In some examples, the AC excitation can be a narrow bandwidth signal where the voltage is ramped from zero to a maximum amplitude voltage similar to a Gaussian modulated sinusoidal burst with narrow band. Exciting two adjacent column electrodes 1460 and 1462 with the same signal can result in the generation of shear wave energy that is at a maximum at the leftmost edge of column electrode 1460 and the rightmost edge of column electrode 1462, as indicated by the dashed lines in the upper view of FIG. 14A. Shear wave resonance can be primarily generated using the transverse piezoelectric coefficient d31 of piezo material 1434, which can cause the transducer to expand and compress laterally when an AC voltage is applied. This mode of excitation can create a bipolar form for shear wave where the maximum amplitude occurs at both ends of the transducer with an opposite polarity. Utilizing two adjacent column electrodes 1460 and 1462 can ensure that the shear wave energy at the outside edges are far enough apart so that shear wave energy is present in symbolically illustrated areas 1470 and 1472, and is not canceled out. To maintain sufficient distance, in some examples the width of each column electrode 1460 and 1462 can be about 2.49 mm, producing a total edge separation of about 5 mm.

Because shear wave energy can be at a maximum at the leftmost edge of column electrode 1460 and the rightmost edge of column electrode 1462 and present in areas 1470 and 1472, the single row electrode and column electrodes 1464 and 1466 on either side of column electrodes 1460 and 1462 can be configured as ultrasonic receivers to detect vibrations from the resonant shear waves in sensing plate 1438 (i.e., to detect the shear wave energy levels shown symbolically in areas 1470 and 1472) and generate voltages representative of resonant shear wave amplitudes. As noted above, amplitude reductions due to an object present on sensing plate 1438 can be detected by the ultrasonic receivers.

At time period t1 (lower cross-sectional view of FIG. 14A), the column electrodes can be reconfigured such that adjacent column electrodes 1462 and 1466 now act as an ultrasonic transmitter, and column electrodes 1460 and 1474 act as ultrasonic receivers. At subsequent time periods (e.g., t2, t3, t4, etc.), the column electrodes can be reconfigured in sequence along a particular direction (e.g., the x-direction) until every transducer (i.e., ultrasonic "touch pixel") located at the intersection of each column electrode and the single row electrode has captured one or more shear wave amplitudes. The sequential process illustrated in FIG. 14A can then be repeated for different row electrodes (e.g., in the y-direction) until a complete two-dimensional shear wave image is captured. As is evident from the sequence of FIG. 14A, a number of ultrasonic touch pixels can capture shear wave amplitudes at different times (e.g., the pixel associated with column electrode 1466 can capture shear wave amplitudes at time periods t0 and t3). Accordingly, in some examples, when multiple shear wave amplitudes have been captured at a particular touch pixel, those amplitudes can be averaged or otherwise processed to produce a single amplitude value at that touch pixel.

Figure 14B:
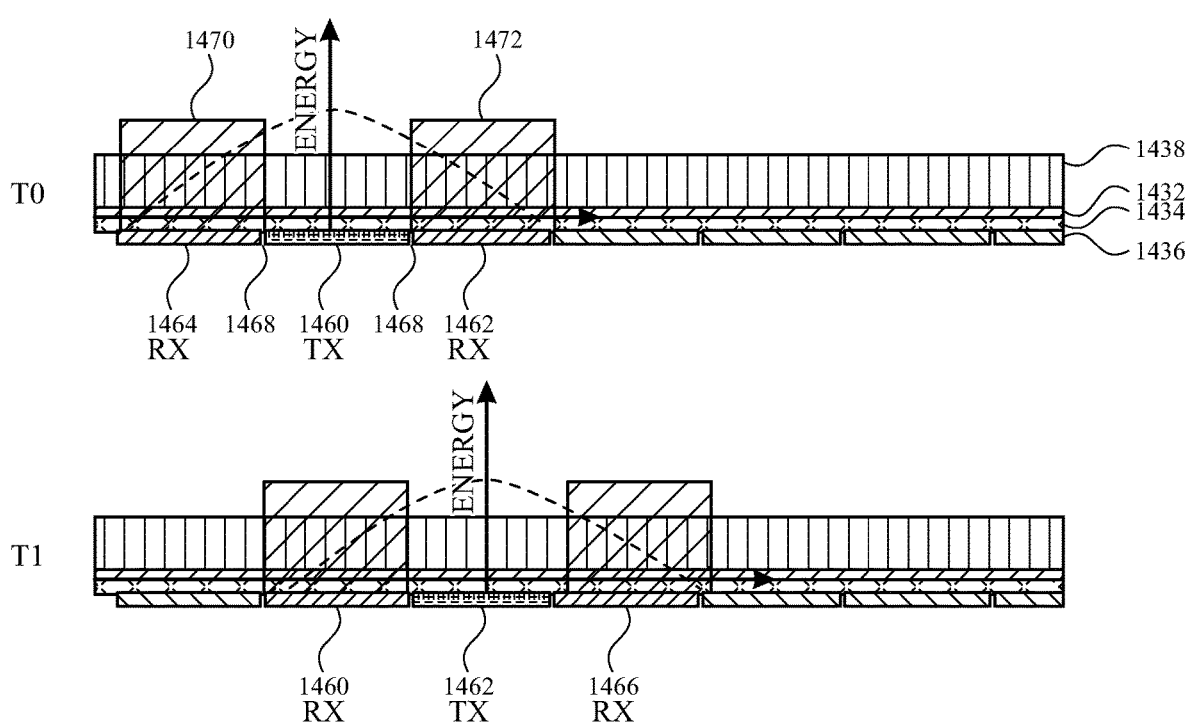
FIG. 14B illustrates a cross-sectional view of compressional wave generation and detection using separate transducers according to examples of the disclosure.

FIG. 14B illustrates a cross-sectional view of compressional wave generation and detection using separate transducers according to examples of the disclosure. At time period t0 (upper cross-sectional view), a single row electrode in first conductive material layer 1432 and a single column electrode 1460 in second conductive material layer 1436 can be configured as an ultrasonic transmitter and driven with AC excitation signals to generate resonant compressional waves in sensing plate 1438. In some examples, the AC excitation can be a narrow bandwidth signal where the voltage is ramped from zero to a maximum amplitude voltage similar to a Gaussian modulated sinusoidal burst with narrow band. Exciting column electrode 1460 can result in the generation of compressional wave energy that is at a maximum at the center of column electrode 1460, as indicated by the dashed line in the upper view of FIG. 14B, and is also present in symbolically illustrated areas 1470 and 1472.

Because compressional wave energy can be at a maximum at the center of column electrode 1460 and present in areas 1470 and 1472, the single row electrode and column electrodes 1464 and 1462 on either side of column electrode 1460 can be configured as ultrasonic receivers to detect vibrations from the resonant compressional waves in sensing plate 1438 (i.e., to detect the compressional wave energy levels shown symbolically in areas 1470 and 1472) and generate voltages representative of resonant compressional wave amplitudes. As noted above, amplitude reductions due to an object or liquid present on sensing plate 1438 can be detected by the ultrasonic receivers.

At time period t1 (lower cross-sectional view of FIG. 14B), the column electrodes can be reconfigured such that column electrode 1462 now acts as an ultrasonic transmitter, and column electrodes 1460 and 1466 act as ultrasonic receivers. At subsequent time periods (e.g., t2, t3, t4, etc.), the column electrodes can be reconfigured in sequence along a particular direction (e.g., the x-direction) until every transducer (i.e., ultrasonic "touch pixel") located at the intersection of each column electrode and the single row electrode has captured one or more compressional wave amplitudes. The sequential process illustrated in FIG. 14B can then be repeated for different row electrodes (e.g., in the y-direction) until a complete two-dimensional compressional wave image is captured. As is evident from the sequence of FIG. 14B, a number of ultrasonic touch pixels can capture shear wave amplitudes at different times (e.g., the pixel associated with column electrode 1462 can capture shear wave amplitudes at time periods t0 and t2). Accordingly, in some examples, when multiple compressional wave amplitudes have been captured at a particular touch pixel, those amplitudes can be averaged or otherwise processed to produce a single amplitude value at that touch pixel.

In some examples, the gaps 1468 between adjacent row and column electrodes in FIGS. 14A and 14B, referred to herein as kerf, can influence the timing of when the ultrasonic receivers measure the energy of resonating shear and compressional waves. For example, in FIG. 14A, closely spaced electrodes having a kerf 1468 of less than about 50 microns can result in crosstalk between column electrode 1460 configured as part of an ultrasonic transmitter, and column electrode 1464 configured as part of an ultrasonic receiver. Similar crosstalk can exist between column electrode 1462 configured as part of an ultrasonic transmitter, and column electrode 1466 configured as part of an ultrasonic receiver. Because of the potential for crosstalk, in some examples when the kerf is less than about 50 microns the ultrasonic receivers can be configured to detect resonant shear or compressional wave energy only after the ultrasonic transmitters have ceased resonant shear or compressional wave generation. In other examples, when the kerf is greater than about 50 microns, the potential for crosstalk can be reduced, and ultrasonic receivers can be configured to detect resonant shear or compressional wave energy at the same time that the ultrasonic transmitters are generating the shear or compressional waves. A further advantage of row and column electrodes having a kerf less than 50 microns is that these small gaps between electrodes provide improved optical uniformity when utilized in touch screen applications, while a kerf larger than 50 microns might create undesirable visual artifacts.

Figure 15A:
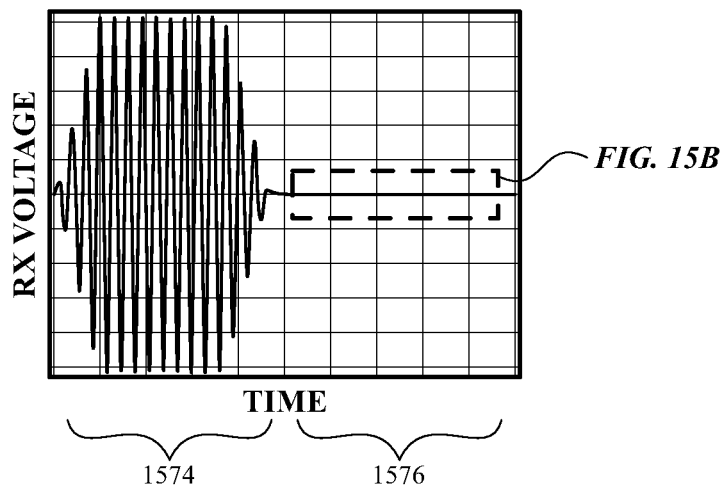
FIG. 15A illustrates a signal received at an ultrasonic receiver configured to detect resonant shear wave energy after the ultrasonic transmitters have ceased resonant shear wave generation according to examples of the disclosure.

FIG. 15A illustrates a signal received at an ultrasonic receiver configured to detect resonant shear wave energy after the ultrasonic transmitters have ceased resonant shear wave generation according to examples of the disclosure. In the example of FIG. 15A, the kerf separating the transmitters and receivers is about 10 microns, and because of the potential for crosstalk, the transmitter is driven with AC excitation signals only during transmit window 1574. During receive window 1576, the resonant shear wave can continue to ring within the sensing plate even in the absence of the transmitter excitation signal. Because the signal decays slowly, over a relatively long period of time, the receiver can detect the shear wave energy during receive window 1576.

Figure 15B:
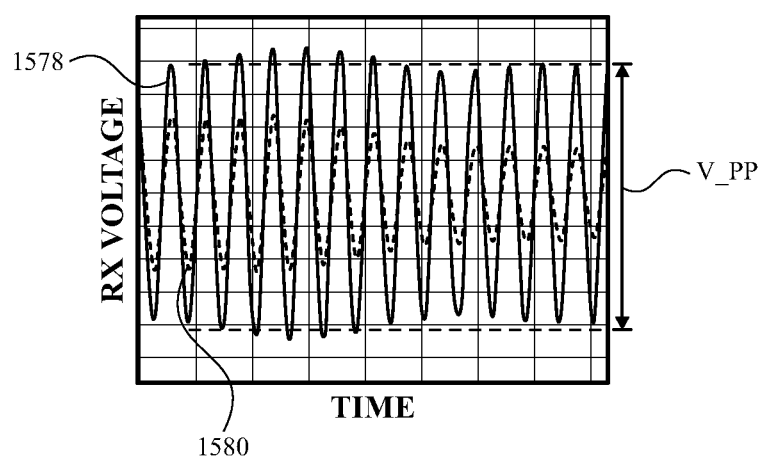
FIG. 15B illustrates the signal received at the ultrasonic receiver during the receive window of FIG. 15A according to examples of the disclosure.

FIG. 15B illustrates the signal received at the ultrasonic receiver during the receive window 1576 of FIG. 15A according to examples of the disclosure. In the example of FIG. 15B, during the receive window a larger resonant shear wave amplitude 1578 can be detected when no object is present, and a smaller resonant shear wave amplitude 1580 can be detected when an object is present. Although not shown in FIG. 15B, a resonant shear wave amplitude slightly smaller than amplitude 1578 can also be detected when liquid is present. As discussed above, these amplitudes can be utilized to determine whether no object is present, an object is present, or liquid is present.

Figure 15C:
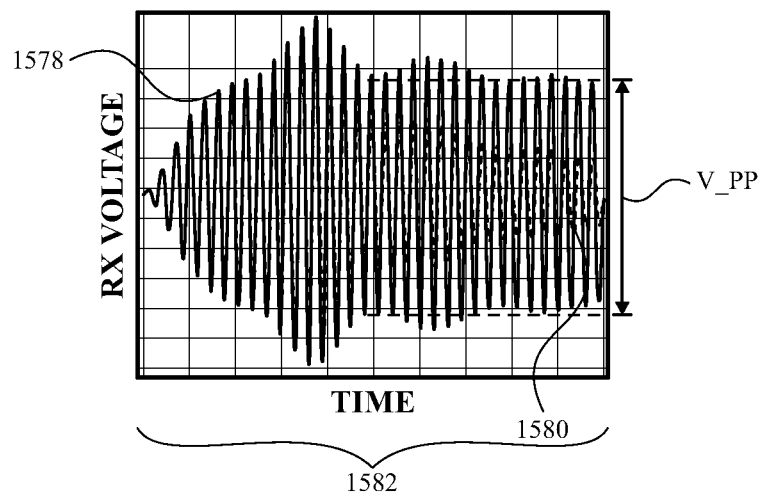
FIG. 15C illustrates a signal received at an ultrasonic receiver configured to detect resonant shear wave energy while the ultrasonic transmitters are generating resonant shear waves according to examples of the disclosure.

FIG. 15C illustrates a signal received at an ultrasonic receiver configured to detect resonant shear wave energy while the ultrasonic transmitters are generating resonant shear waves according to examples of the disclosure. In other words, the transmit window and the receive window can be at least partially overlapping in time. In the example of FIG. 15C, the kerf separating the transmitters and receivers is about 50 microns, and because of the reduced potential for crosstalk, the transmitter can generate resonant shear waves while the receivers are detecting shear wave amplitudes during the same transmit/receive window 1582. During the transmit/receive window 1582, a larger resonant shear wave amplitude 1578 can be detected when no object is present, and a smaller resonant shear wave amplitude 1580 can be detected when an object is present. Although not shown in FIG. 15B, a resonant shear wave amplitude slightly smaller than amplitude 1578 can also be detected when liquid is present. As discussed above, these amplitudes can be utilized to determine whether no object is present, an object is present, or liquid is present.

Although FIGS. 15A-15C are described with respect to the generation and measurement of resonant shear waves, the same principles can be applied to the generation and measurement of resonant compressional waves.

Figure 16A:
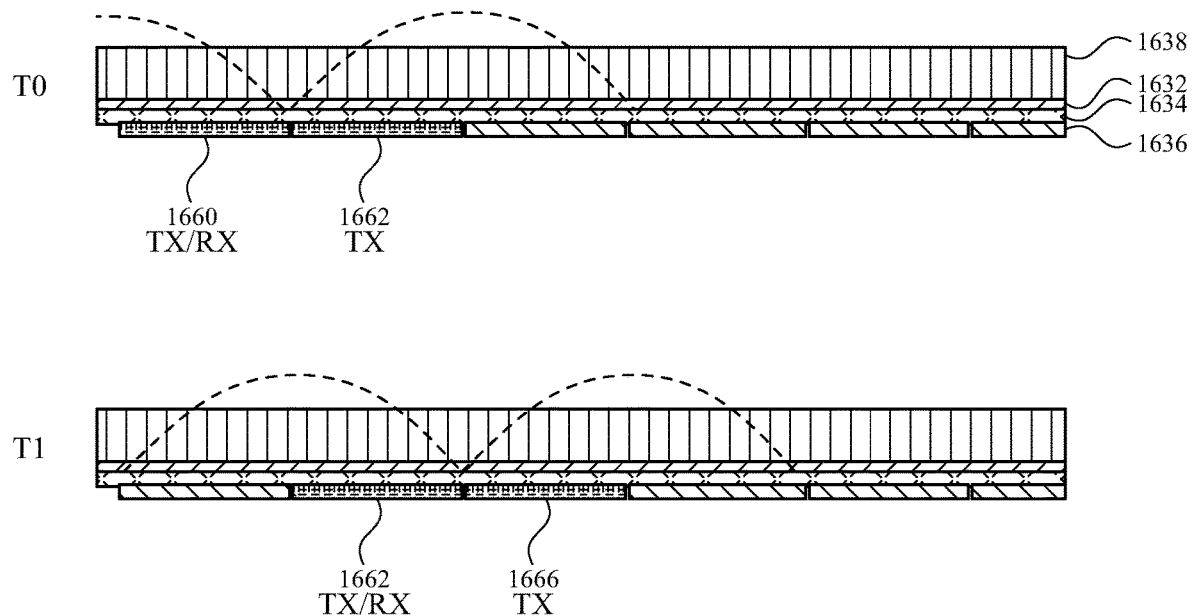
FIG. 16A illustrates a cross-sectional view of shear wave generation and detection using the same transducer according to examples of the disclosure.

FIG. 16A illustrates a cross-sectional view of shear wave generation and detection using the same transducer according to examples of the disclosure. In the example of FIG. 16A, piezo material 1634 (e.g., aluminum nitride, zinc oxide, etc.) can be sandwiched between row electrodes in first conductive material layer 1632 and column electrodes in second conductive material layer 1636. First conductive material layer 1632 can be formed on sensing plate 1638 (e.g., front crystal glass or other material that is a good resonator). At time period t0 (upper cross-sectional view), a single row electrode in first conductive material layer 1632 and two adjacent column electrodes 1660 and 1662 in second conductive material layer 1636 can be configured as an ultrasonic transmitter and driven with AC excitation signals to generate resonant shear waves in sensing plate 1638. In some examples, the AC excitation can be a narrow bandwidth signal where the voltage is ramped from zero to a maximum amplitude voltage similar to a Gaussian modulated sinusoidal burst with narrow band. Exciting two adjacent column electrodes 1660 and 1662 with the same signal can result in the generation of shear wave energy that is at a maximum at the leftmost edge of column electrode 1660 and the rightmost edge of column electrode 1662, as indicated by the dashed lines in FIG. 16A. Utilizing two adjacent column electrodes 1660 and 1662 can ensure that the shear wave energy at the outside edges are far enough apart so that shear wave energy is not canceled out. To maintain sufficient distance, in some examples the width of each column electrode 1660 and 1662 can be about 2.49 mm, producing a total edge separation of about 5 mm.

Because shear wave energy can be at a maximum at the leftmost edge of column electrode 1660 and the rightmost edge of column electrode 1662, after resonant shear wave generation has ceased, column electrode 1660 can be reconfigured as an ultrasonic receiver to detect vibrations from the resonant shear waves in sensing plate 1638 and generate voltages representative of resonant shear wave amplitudes (shear wave energy levels). As noted above, amplitude reductions due to an object present on sensing plate 1638 can be detected by the ultrasonic receivers.

At time period t1 (lower cross-sectional view of FIG. 16A), the column electrodes can be reconfigured such that adjacent column electrodes 1662 and 1666 now act as an ultrasonic transmitter, and after resonant shear wave generation has ceased, column electrode 1662 can be reconfigured as an ultrasonic receiver. At subsequent time periods (e.g., t2, t3, t4, etc.), the column electrodes can be reconfigured in sequence along a particular direction (e.g., the x-direction) until every transducer (i.e., ultrasonic "touch pixel") located at the intersection of each column electrode and the single row electrode has captured one or more shear wave amplitudes. The sequential process illustrated in FIG. 16A can then be repeated for different row electrodes (e.g., in the y-direction) until a complete two-dimensional shear wave image is captured.

Figure 16B:
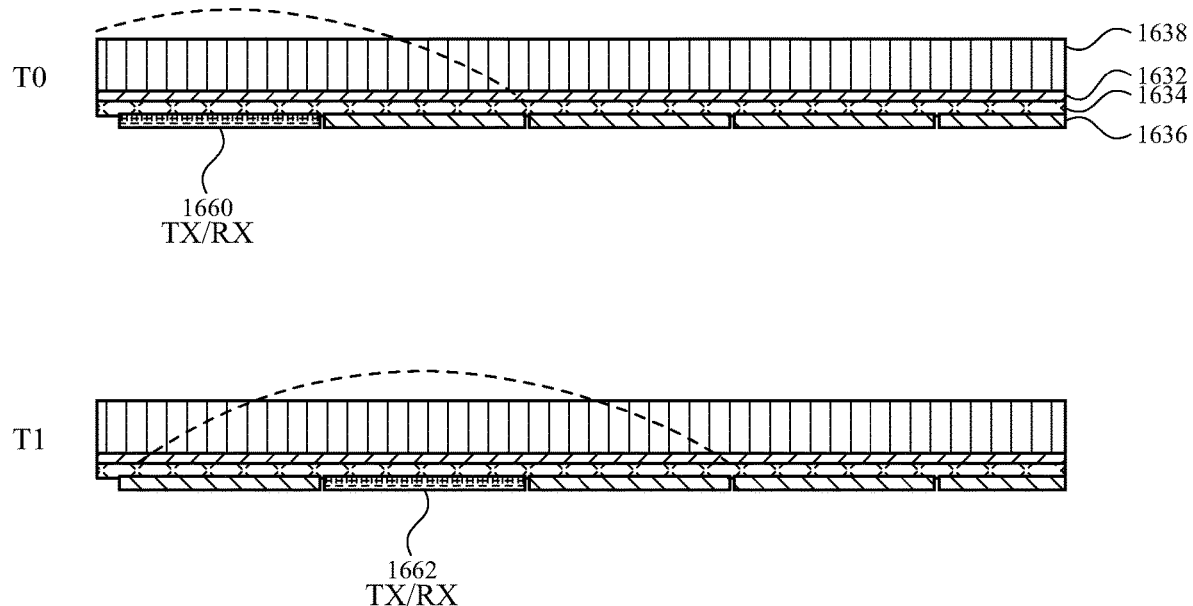
FIG. 16B illustrates a cross-sectional view of compressional wave generation and detection using the same transducer according to examples of the disclosure.

FIG. 16B illustrates a cross-sectional view of compressional wave generation and detection using the same transducer according to examples of the disclosure. At time period t0 (upper cross-sectional view), a single row electrode in first conductive material layer 1632 and a single column electrode 1660 in second conductive material layer 1636 can be configured as an ultrasonic transmitter and driven with AC excitation signals to generate resonant compressional waves in sensing plate 1638. In some examples, the AC excitation can be a narrow bandwidth signal where the voltage is ramped from zero to a maximum amplitude voltage similar to a Gaussian modulated sinusoidal burst with narrow band. Exciting column electrode 1660 can result in the generation of compressional wave energy that is at a maximum at the center of column electrode 1660, as indicated by the dashed line in FIG. 16B.

Because compressional wave energy can be at a maximum at the center of column electrode 1660, after resonant compressional wave generation has ceased, column electrode 1660 can be reconfigured as an ultrasonic receiver to detect vibrations from the resonant compressional waves in sensing plate 1638 and generate voltages representative of resonant compressional wave amplitudes (compressional wave energy levels). As noted above, amplitude reductions due to an object or liquid present on sensing plate 1638 can be detected by the ultrasonic receivers.

At time period t1 (lower cross-sectional view of FIG. 16B), the column electrodes can be reconfigured such that column electrode 1662 now acts as an ultrasonic transmitter, and after resonant compressional wave generation has ceased, column electrode 1662 can be reconfigured to act as an ultrasonic receiver. At subsequent time periods (e.g., t2, t3, t4, etc.), the column electrodes can be reconfigured in sequence along a particular direction (e.g., the x-direction) until every transducer (i.e., ultrasonic "touch pixel") located at the intersection of each column electrode and the single row electrode has captured one or more compressional wave amplitudes. The sequential process illustrated in FIG. 16B can then be repeated for different row electrodes (e.g., in the y-direction) until a complete two-dimensional compressional wave image is captured.

Figure 17A:
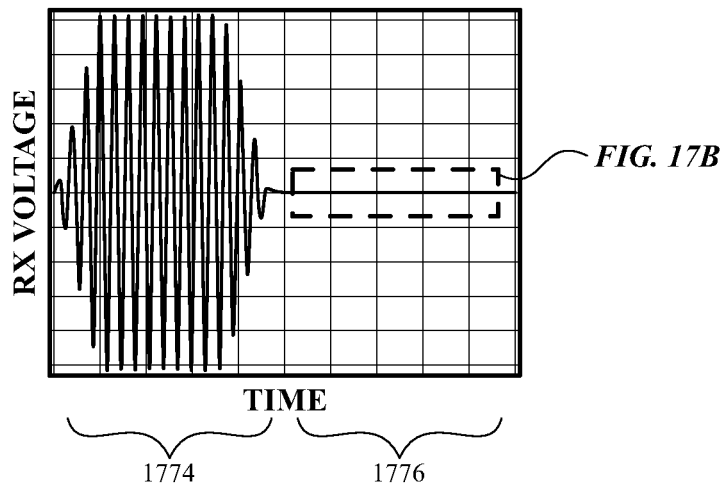
FIG. 17A illustrates a signal received at an ultrasonic transducer configured to perform both shear or compressional wave generation and detection according to examples of the disclosure.

FIG. 17A illustrates a signal received at an ultrasonic transducer configured to perform both shear or compressional wave generation and detection according to examples of the disclosure. In the example of FIG. 17A, which corresponds to FIGS. 16A-16B, the ultrasonic transducer is configured as a transmitter and driven with AC excitation signals only during transmit window 1774. The transducer can then be reconfigured as a receiver, and during receive window 1776, the resonant wave can continue to ring within the sensing plate even in the absence of the transmitter excitation signal. Because the signal decays slowly, over a relatively long period of time, the receiver can detect the shear wave energy during receive window 1776.

Figure 17B:
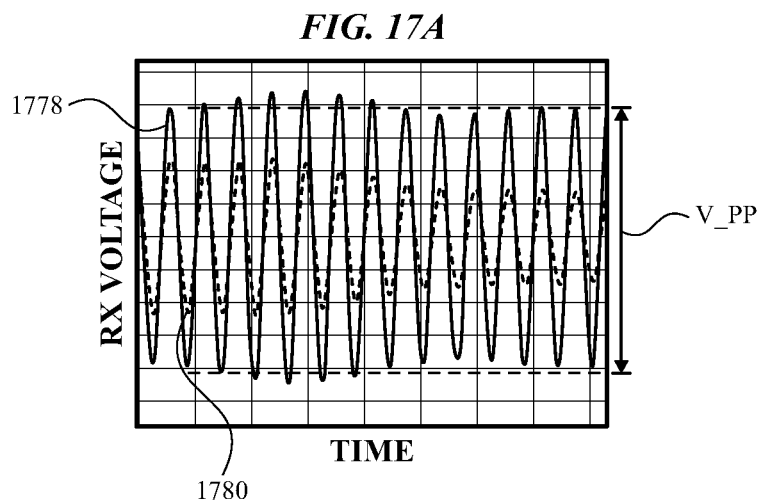
FIG. 17B illustrates the signal received at the ultrasonic receiver during the receive window 1776 of FIG. 17A according to examples of the disclosure.

FIG. 17B illustrates the signal received at the ultrasonic receiver during the receive window 1776 of FIG. 17A according to examples of the disclosure. In the example of FIG. 17B, during the receive window a larger resonant wave amplitude 1778 can be detected when no object is present, and a smaller resonant wave amplitude 1780 can be detected when an object is present. Although not shown in FIG. 17B, a resonant wave amplitude slightly smaller than amplitude 1778 can also be detected when liquid is present. As discussed above, these amplitudes can be utilized to determine whether no object is present, an object is present, or liquid is present.

Figure 18:
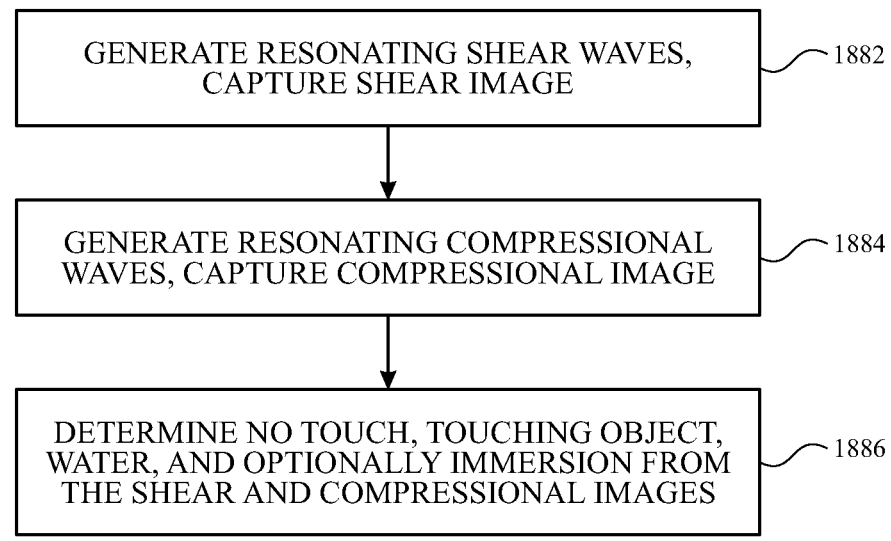
FIG. 18 illustrates a flowchart for performing water agnostic touch using non-propagating (resonating) shear and compressional waves according to examples of the disclosure.

FIG. 18 illustrates a flowchart for performing water agnostic touch using non-propagating (resonating) shear and compressional waves according to examples of the disclosure. In the example of FIG. 18, resonating shear waves are generated and used to capture a shear image at 1882. Resonating compressional waves are also generated and used to capture a compressional image at 1184. It should be understood that the order of 1882 and 1884 can be reversed or merged in a combined capture of shear and compressional images according to various examples of the disclosure. The captured shear and compressional images can then be used to determine areas of no touch, a touching object, liquid, and optionally immersion at 1886.

Therefore, according to the above, some examples of the disclosure are directed to a device comprising: a surface; an array of transducers coupled to the surface, each transducer in the array of transducers configured to generate an ultrasonic shear wave and an ultrasonic compressional wave and to receive a reflection of the ultrasonic shear wave and a reflection of the ultrasonic compressional wave during non-overlapping windows; and a processor coupled to the array of transducers configured to, for each transducer: in accordance with the reflection from the ultrasonic shear wave being less than a first threshold and the reflection from the ultrasonic compressional wave being less than a second threshold, determine an object in contact with a region of the surface corresponding to the transducer; in accordance with the reflection from the ultrasonic shear wave being greater than the first threshold and the reflection from the ultrasonic compressional wave being less than the second threshold, determine a liquid in contact with the region of the surface corresponding to the transducer; and in accordance with the reflection from the ultrasonic shear wave being greater than the first threshold and the reflection from the ultrasonic compressional wave being greater than the second threshold, determine no object in contact with the region of the surface corresponding to the transducer. Additionally or alternatively to one or more of the examples disclosed above, in some examples each transducer in the array of transducers is an ultrasonic shear wave transducer. Additionally or alternatively to one or more of the examples disclosed above, in some examples an x-direction is defined parallel to the surface and a z-direction is defined normal to the surface, each ultrasonic shear wave transducer comprising: first and second electrodes formed on a top and a bottom of the ultrasonic shear wave transducer in the z-direction; wherein a polling direction of the shear wave transducer is aligned along the x-direction. Additionally or alternatively to one or more of the examples disclosed above, in some examples the reflection from the ultrasonic shear wave is a first reflection of the ultrasonic shear wave, and the reflection from the ultrasonic compressional wave is a first reflection of the ultrasonic compressional wave. Additionally or alternatively to one or more of the examples disclosed above, in some examples the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave. Additionally or alternatively to one or more of the examples disclosed above, in some examples the surface has a characteristic ultrasonic compressional wave velocity, a characteristic ultrasonic shear wave velocity and a thickness selected such that a first reflection from the ultrasonic shear wave received at a particular transducer is non-overlapping in time with respect to a first reflection from the ultrasonic compressional wave received at the particular transducer. Additionally or alternatively to one or more of the examples disclosed above, in some examples each transducer in the array of transducers is configured to generate a plurality of pulses, each pulse including a first number of cycles at a first frequency; wherein the first number of cycles and the first frequency are selected such that a first reflection from the ultrasonic shear wave received at a particular transducer is non-overlapping in time with respect to a first reflection from the ultrasonic compressional wave received at the particular transducer.

Some examples of the disclosure are directed to a method for detecting an object and water on a surface, comprising: generating an ultrasonic shear wave and an ultrasonic compressional wave from each transducer in an array of transducers; receiving a reflection of the ultrasonic shear wave and a reflection of the ultrasonic compressional wave during non-overlapping time windows; and for each transducer: in accordance with the reflection from the ultrasonic shear wave being less than a first threshold and the reflection from the ultrasonic compressional wave being less than a second threshold, determining an object in contact with a region of the surface corresponding to the transducer; in accordance with the reflection from the ultrasonic shear wave being greater than the first threshold and the reflection from the ultrasonic compressional wave being less than the second threshold, determining a liquid in contact with the region of the surface corresponding to the transducer; and in accordance with the reflection from the ultrasonic shear wave being greater than the first threshold and the reflection from the ultrasonic compressional wave being greater than the second threshold, determining no object in contact with the region of the surface corresponding to the transducer. Additionally or alternatively to one or more of the examples disclosed above, in some examples the method further comprises generating the ultrasonic shear wave and the ultrasonic compressional wave from each transducer using an ultrasonic shear wave transducer. Additionally or alternatively to one or more of the examples disclosed above, in some examples an x-direction is defined parallel to the surface and a z-direction is defined normal to the surface, and the method further comprises orienting each ultrasonic shear wave transducer such that a polling direction of the ultrasonic shear wave transducer is aligned along the x-direction. Additionally or alternatively to one or more of the examples disclosed above, in some examples the reflection from the ultrasonic shear wave is a first reflection of the ultrasonic shear wave, and the reflection from the ultrasonic compressional wave is a first reflection of the ultrasonic compressional wave. Additionally or alternatively to one or more of the examples disclosed above, in some examples the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave. Additionally or alternatively to one or more of the examples disclosed above, in some examples the method further comprises selecting a material of the surface having a characteristic ultrasonic compressional wave velocity, a characteristic ultrasonic shear wave velocity, and a thickness such that a first reflection from the ultrasonic shear wave received at a particular transducer is non-overlapping in time with respect to a first reflection from the ultrasonic compressional wave received at the particular transducer. Additionally or alternatively to one or more of the examples disclosed above, in some examples the method further comprises generating the ultrasonic shear wave and the ultrasonic compressional wave from each transducer in the array of transducers with a plurality of pulses, each pulse including a first number of cycles at a first frequency; wherein the first number of cycles and the first frequency are selected such that a first reflection from the ultrasonic shear wave received at a particular transducer is non-overlapping in time with respect to a first reflection from the ultrasonic compressional wave received at the particular transducer.

Some examples of the disclosure are directed to a device comprising: means for propagating an ultrasonic shear wave and an ultrasonic compressional wave through a surface material from each location in an array; means for receiving a reflection of the ultrasonic shear wave and a reflection of the ultrasonic compressional wave from each location in the array during non-overlapping time windows; and for each means for propagating: in accordance with the reflection from the ultrasonic shear wave being less than a first threshold and the reflection from the ultrasonic compressional wave being less than a second threshold, determining an object in contact with a region of the surface corresponding to the transducer; in accordance with the reflection from the ultrasonic shear wave being greater than the first threshold and the reflection from the ultrasonic compressional wave being less than the second threshold, determining a liquid in contact with the region of the surface corresponding to the transducer; and in accordance with the reflection from the ultrasonic shear wave being greater than the first threshold and the reflection from the ultrasonic compressional wave being greater than the second threshold, determining no object in contact with the region of the surface corresponding to the transducer. Additionally or alternatively to one or more of the examples disclosed above, in some examples the means for generating the ultrasonic shear wave and the ultrasonic compressional wave from each location in the array comprise an ultrasonic shear wave transducer. Additionally or alternatively to one or more of the examples disclosed above, in some examples an x-direction is defined parallel to the surface and a z-direction is defined normal to the surface, and each ultrasonic shear wave transducer is oriented such that a polling direction of the ultrasonic shear wave transducer is aligned along the x-direction. Additionally or alternatively to one or more of the examples disclosed above, in some examples the reflection from the ultrasonic shear wave is a first reflection of the ultrasonic shear wave, and the reflection from the ultrasonic compressional wave is a first reflection of the ultrasonic compressional wave. Additionally or alternatively to one or more of the examples disclosed above, in some examples the reflection from the ultrasonic shear wave is a reflection subsequent to a first reflection of the ultrasonic shear wave, and the reflection from the ultrasonic compressional wave is a reflection subsequent to a first reflection of the ultrasonic compressional wave. Additionally or alternatively to one or more of the examples disclosed above, in some examples the surface material has a characteristic ultrasonic compressional wave velocity, a characteristic ultrasonic shear wave velocity, and a thickness such that a first reflection from the ultrasonic shear wave received at a particular transducer is non-overlapping in time with respect to a first reflection from the ultrasonic compressional wave received at the particular transducer. Additionally or alternatively to one or more of the examples disclosed above, in some examples the means for propagating configured for generating the ultrasonic shear wave and the ultrasonic compressional wave from each transducer in the array of transducers with a plurality of pulses, each pulse including a first number of cycles at a first frequency; wherein the first number of cycles and the first frequency are selected such that a first reflection from the ultrasonic shear wave received at a particular transducer is non-overlapping in time with respect to a first reflection from the ultrasonic compressional wave received at the particular transducer.

Some examples of the disclosure are directed to a device comprising a sensing plate, a plurality of transducers coupled to a back side of the sensing plate, the plurality of transducers configurable to generate ultrasonic waves within the sensing plate at a plurality of transducer locations at a shear wave resonant frequency and at a compressional wave resonant frequency, and further configurable to detect a shear wave energy level of the shear waves resonating within the sensing plate at the shear wave resonant frequency and a compressional wave energy level of the compressional waves resonating with the sensing plate at the compressional wave resonant frequency at the plurality of transducer locations, and a processor coupled to the plurality of transducers and configured for, at each of the plurality of transducer locations, determining whether the shear wave energy level is less than a shear wave threshold and whether the compressional wave energy level is less than a compressional wave threshold, in accordance with a determination that the shear wave energy level is less than the shear wave threshold and the compressional wave energy level is less than the compressional wave threshold, determining that an object is in contact with the sensing plate at the transducer location, and in accordance with a determination that the shear wave energy level is greater than the shear wave threshold and the compressional wave energy level is less than the compressional wave threshold, determining that a liquid is in contact with the sensing plate at the transducer location. Alternatively or additionally to one or more of the examples disclosed above, in some examples the processor is further configured for, at each of the plurality of transducer locations, in accordance with a determination that the shear wave energy level is greater than the shear wave threshold and the compressional wave energy level is greater than the compressional wave threshold, determining that no object or liquid is in contact with the sensing plate at the transducer location. Alternatively or additionally to one or more of the examples disclosed above, in some examples the processor is further configured for, in accordance with a determination that the shear wave energy level is greater than the shear wave threshold and the compressional wave energy level is greater than the compressional wave threshold for a first plurality of adjacent transducer locations representing an area greater than a first surface area, determining that the sensing plate is located in air. Alternatively or additionally to one or more of the examples disclosed above, in some examples the processor is further configured for, in accordance with a determination that the compressional wave energy level is less than the compressional wave threshold and the shear wave energy level is less than the shear wave threshold for a first plurality of adjacent transducer locations representing an area greater than a first surface area, determining that the sensing plate is immersed in liquid. Alternatively or additionally to one or more of the examples disclosed above, in some examples the processor is further configured for, in accordance with a determination that the compressional wave energy level is less than the compressional wave threshold and the shear wave energy level is less than the shear wave threshold for a first plurality of adjacent transducer locations representing an area greater than a first surface area, determining that the sensing plate is under a palm touch. Alternatively or additionally to one or more of the examples disclosed above, in some examples the shear waves and the compressional waves are non-propagating waves having a group velocity of about zero. Alternatively or additionally to one or more of the examples disclosed above, in some examples the plurality of transducers comprise a first conductive material layer patterned into a plurality of rows and formed on the back side of the sensing plate, a piezo material layer disposed on the first conductive material layer; and a second conductive material layer patterned into a plurality of columns and disposed on the piezo material layer, wherein a transducer is formed at a location where the first conductive material layer crosses the second conductive material layer with the piezo material layer disposed between. Alternatively or additionally to one or more of the examples disclosed above, in some examples the processor is further configured to generate ultrasonic waves at the shear wave resonant frequency at second and third adjacent transducers in a first time period, and detect the shear wave energy level of the shear waves at first and fourth transducers in the first time period, the second transducer adjacent to the first transducer and the fourth transducer adjacent to the third transducer, the first through fourth transducers arranged consecutively in a first direction. Alternatively or additionally to one or more of the examples disclosed above, in some examples the processor is further configured to generate ultrasonic waves at the compressional wave resonant frequency at a second transducer in a first time period, and detect the compressional wave energy level of the compressional waves at first and third transducers in the first time period, the first transducer adjacent to the second transducer and the second transducer adjacent to the third transducer, the first through third transducers arranged consecutively in a first direction. Alternatively or additionally to one or more of the examples disclosed above, in some examples the processor is further configured to generate ultrasonic waves at the shear wave resonant frequency at first and second adjacent transducers in a first time period, and detect the shear wave energy level of the shear waves at the first transducer in the first time period, the first and second transducers arranged consecutively in a first direction. Alternatively or additionally to one or more of the examples disclosed above, in some examples the processor is further configured to generate ultrasonic waves at the compressional wave resonant frequency at a first transducer in a first time period, and detect the compressional wave energy level of the compressional waves at the first transducer in the first time period. Alternatively or additionally to one or more of the examples disclosed above, in some examples the processor is further configured to generate ultrasonic shear or compressional wave resonant frequencies at a first transducer in a transmit window, and detect the shear or compressional wave energy level at a second transducer adjacent to the first transducer in a receive window following the transmit window. Alternatively or additionally to one or more of the examples disclosed above, in some examples the processor is further configured to generate ultrasonic shear or compressional wave resonant frequencies at a first transducer in a transmit/receive window, and detect the shear or compressional wave energy level at a second transducer adjacent to the first transducer in the transmit/receive window.

Some examples of the disclosure are directed to a method for detecting an object or liquid on a sensing plate, comprising generating ultrasonic waves within the sensing plate at a plurality of locations at a shear wave resonant frequency and at a compressional wave resonant frequency, detecting a shear wave energy level of the shear waves resonating within the sensing plate at the shear wave resonant frequency and a compressional wave energy level of the compressional waves resonating with the sensing plate at the compressional wave resonant frequency at the plurality of locations, and at each of the plurality of locations, determining whether the shear wave energy level is less than a shear wave threshold and whether the compressional wave energy level is less than a compressional wave threshold, in accordance with a determination that the shear wave energy level is less than the shear wave threshold and the compressional wave energy level is less than the compressional wave threshold, determining that an object is in contact with the sensing plate at the location, and in accordance with a determination that the shear wave energy level is greater than the shear wave threshold and the compressional wave energy level is less than the compressional wave threshold, determining that a liquid is in contact with the sensing plate at the location. Alternatively or additionally to one or more of the examples disclosed above, in some examples the method further comprises, at each of the plurality of locations, in accordance with a determination that the shear wave energy level is greater than the shear wave threshold and the compressional wave energy level is greater than the compressional wave threshold, determining that no object or liquid is in contact with the sensing plate at the location. Alternatively or additionally to one or more of the examples disclosed above, in some examples the method further comprises, in accordance with a determination that the shear wave energy level is greater than the shear wave threshold and the compressional wave energy level is greater than the compressional wave threshold for a first plurality of adjacent locations representing an area greater than a first surface area, determining that the sensing plate is located in air. Alternatively or additionally to one or more of the examples disclosed above, in some examples the method further comprises, in accordance with a determination that the compressional wave energy level is less than the compressional wave threshold for a first plurality of adjacent locations representing an area greater than a first surface area and the shear wave energy level is less than the shear wave threshold, determining that the sensing plate is immersed in liquid. Alternatively or additionally to one or more of the examples disclosed above, in some examples the shear waves and the compressional waves are non-propagating waves having a group velocity of about zero. Alternatively or additionally to one or more of the examples disclosed above, in some examples the method further comprises generating the ultrasonic waves at the plurality of locations by applying an AC excitation signal across piezo material at each of the plurality of locations. Alternatively or additionally to one or more of the examples disclosed above, in some examples the method further comprises generating ultrasonic waves at the shear wave resonant frequency at second and third adjacent locations in a first time period, and detecting the shear wave energy level of the shear waves at first and fourth locations in the first time period, the second location adjacent to the first location and the fourth location adjacent to the third location, the first through fourth locations arranged consecutively in a first direction. Alternatively or additionally to one or more of the examples disclosed above, in some examples the method further comprises generating ultrasonic waves at the compressional wave resonant frequency at a second location in a first time period, and detecting the compressional wave energy level of the compressional waves at first and third locations in the first time period, the first location adjacent to the second location and the second location adjacent to the third location, the first through third locations arranged consecutively in a first direction. Alternatively or additionally to one or more of the examples disclosed above, in some examples the method further comprises generating ultrasonic waves at the shear wave resonant frequency at first and second adjacent locations in a first time period, and detecting the shear wave energy level of the shear waves at the first location in the first time period, the first and second locations arranged consecutively in a first direction. Alternatively or additionally to one or more of the examples disclosed above, in some examples the method further comprises generating ultrasonic waves at the compressional wave resonant frequency at a first location in a first time period, and detecting the compressional wave energy level of the compressional waves at the first location in the first time period. Alternatively or additionally to one or more of the examples disclosed above, in some examples the method further comprises generating ultrasonic shear or compressional wave resonant frequencies at a first location in a transmit window, and detecting the shear or compressional wave energy level at a second location adjacent to the first location in a receive window following the transmit window. Alternatively or additionally to one or more of the examples disclosed above, in some examples the method further comprises generating ultrasonic shear or compressional wave resonant frequencies at a first location in a transmit/receive window, and detecting the shear or compressional wave energy level at a second location adjacent to the first location in the transmit/receive window.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A device comprising:
   a sensing plate;
   a plurality of transducers coupled to a back side of the sensing plate, the plurality of transducers configurable to generate ultrasonic waves within the sensing plate at a plurality of transducer locations at a shear wave resonant frequency and at a compressional wave resonant frequency, and further configurable to detect a shear wave energy level of the shear waves resonating within the sensing plate at the shear wave resonant frequency and a compressional wave energy level of the compressional waves resonating with the sensing plate at the compressional wave resonant frequency at the plurality of transducer locations; and
   a processor coupled to the plurality of transducers and configured for, at each of the plurality of transducer locations, determining whether the shear wave energy level is less than a shear wave threshold and whether the compressional wave energy level is less than a compressional wave threshold, in accordance with a determination that the shear wave energy level is less than the shear wave threshold and the compressional wave energy level is less than the compressional wave threshold, determining that an object is in contact with the sensing plate at the transducer location, and in accordance with a determination that the shear wave energy level is greater than the shear wave threshold and the compressional wave energy level is less than the compressional wave threshold, determining that a liquid is in contact with the sensing plate at the transducer location.

2. The device of claim 1, the processor further configured for, at each of the plurality of transducer locations:

in accordance with a determination that the shear wave energy level is greater than the shear wave threshold and the compressional wave energy level is greater than the compressional wave threshold, determining that no object or liquid is in contact with the sensing plate at the transducer location.

3. The device of claim 1, the processor further configured for:

in accordance with a determination that the shear wave energy level is greater than the shear wave threshold and the compressional wave energy level is greater than the compressional wave threshold for a first plurality of adjacent transducer locations representing an area greater than a first surface area, determining that the sensing plate is located in air.

4. The device of claim 1, the processor further configured for:

in accordance with a determination that the compressional wave energy level is less than the compressional wave threshold and the shear wave energy level is less than the shear wave threshold for a first plurality of adjacent transducer locations representing an area greater than a first surface area, determining that the sensing plate is immersed in liquid.

5. The device of claim 1, the processor further configured for:

in accordance with a determination that the compressional wave energy level is less than the compressional wave threshold and the shear wave energy level is less than the shear wave threshold for a first plurality of adjacent transducer locations representing an area greater than a first surface area indicative of a finger or thumb touch, determining that the sensing plate is under a palm touch.

6. The device of claim 1, wherein the shear waves and the compressional waves are non-propagating waves having a group velocity of about zero.

7. The device of claim 1, the plurality of transducers comprising:

a first conductive material layer patterned into a plurality of rows and formed on the back side of the sensing plate;

a piezo material layer disposed on the first conductive material layer; and a second conductive material layer patterned into a plurality of columns and disposed on the piezo material layer;

wherein a transducer is formed at a location where the first conductive material layer crosses the second conductive material layer with the piezo material layer disposed between.

8. The device of claim 1, the processor further configured to generate ultrasonic waves at the shear wave resonant frequency at second and third adjacent transducers in a first time period, and detect the shear wave energy level of the shear waves at first and fourth transducers in the first time period, the second transducer adjacent to the first transducer and the fourth transducer adjacent to the third transducer, the first through fourth transducers arranged consecutively in a first direction.

9. The device of claim 1, the processor further configured to generate ultrasonic waves at the compressional wave resonant frequency at a second transducer in a first time period, and detect the compressional wave energy level of the compressional waves at first and third transducers in the first time period, the first transducer adjacent to the second transducer and the second transducer adjacent to the third transducer, the first through third transducers arranged consecutively in a first direction.

10. The device of claim 1, the processor further configured to generate ultrasonic waves at the shear wave resonant frequency at first and second adjacent transducers in a first time period, and detect the shear wave energy level of the shear waves at the first transducer in the first time period, the first and second transducers arranged consecutively in a first direction.

11. The device of claim 1, the processor further configured to generate ultrasonic waves at the compressional wave resonant frequency at a first transducer in a first time period, and detect the compressional wave energy level of the compressional waves at the first transducer in the first time period.

12. The device of claim 1, the processor further configured to generate ultrasonic shear or compressional wave resonant frequencies at a first transducer in a transmit window, and detect the shear or compressional wave energy level at a second transducer adjacent to the first transducer in a receive window following the transmit window.

13. The device of claim 1, the processor further configured to generate ultrasonic shear or compressional wave resonant frequencies at a first transducer in a transmit/receive window, and detect the shear or compressional wave energy level at a second transducer adjacent to the first transducer in the transmit/receive window.

14. A method for detecting an object or liquid on a sensing plate, comprising:

generating ultrasonic waves within the sensing plate at a plurality of locations at a shear wave resonant frequency and at a compressional wave resonant frequency;

detecting a shear wave energy level of the shear waves resonating within the sensing plate at the shear wave resonant frequency and a compressional wave energy level of the compressional waves resonating with the sensing plate at the compressional wave resonant frequency at the plurality of locations; and at each of the plurality of locations, determining whether the shear wave energy level is less than a shear wave threshold and whether the compressional wave energy level is less than a compressional wave threshold, in accordance with a determination that the shear wave energy level is less than the shear wave threshold and the compressional wave energy level is less than the compressional wave threshold, determining that an object is in contact with the sensing plate at the location, and in accordance with a determination that the shear wave energy level is greater than the shear wave threshold and the compressional wave energy level is less than the compressional wave threshold, determining that a liquid is in contact with the sensing plate at the location.

15. The method of claim 14, further comprising, at each of the plurality of locations:

in accordance with a determination that the shear wave energy level is greater than the shear wave threshold and the compressional wave energy level is greater than the compressional wave threshold, determining that no object or liquid is in contact with the sensing plate at the location.

16. The method of claim 14, further comprising:

in accordance with a determination that the shear wave energy level is greater than the shear wave threshold and the compressional wave energy level is greater than the compressional wave threshold for a first plurality of adjacent locations representing an area greater than a first surface area, determining that the sensing plate is located in air.

17. The method of claim 14, further comprising:

in accordance with a determination that the compressional wave energy level is less than the compressional wave threshold for a first plurality of adjacent locations representing an area greater than a first surface area and the shear wave energy level is less than the shear wave threshold, determining that the sensing plate is immersed in liquid.

18. The method of claim 14, wherein the shear waves and the compressional waves are non-propagating waves having a group velocity of about zero.

19. The method of claim 14, further comprising:

generating the ultrasonic waves at the plurality of locations by applying an AC excitation signal across piezo material at each of the plurality of locations.

20. The method of claim 14, further comprising:

generating ultrasonic waves at the shear wave resonant frequency at second and third adjacent locations in a first time period; and detecting the shear wave energy level of the shear waves at first and fourth locations in the first time period, the second location adjacent to the first location and the fourth location adjacent to the third location, the first through fourth locations arranged consecutively in a first direction.

21. The method of claim 14, further comprising:

generating ultrasonic waves at the compressional wave resonant frequency at a second location in a first time period; and detecting the compressional wave energy level of the compressional waves at first and third locations in the first time period, the first location adjacent to the second location and the second location adjacent to the third location, the first through third locations arranged consecutively in a first direction.

22. The method of claim 14, further comprising:

generating ultrasonic waves at the shear wave resonant frequency at first and second adjacent locations in a first time period; and detecting the shear wave energy level of the shear waves at the first location in the first time period, the first and second locations arranged consecutively in a first direction.

23. The method of claim 14, further comprising:

generating ultrasonic waves at the compressional wave resonant frequency at a first location in a first time period; and detecting the compressional wave energy level of the compressional waves at the first location in the first time period.

24. The method of claim 14, further comprising:

generating ultrasonic shear or compressional wave resonant frequencies at a first location in a transmit window; and detecting the shear or compressional wave energy level at a second location adjacent to the first location in a receive window following the transmit window.

25. The method of claim 14, further comprising:

generating ultrasonic shear or compressional wave resonant frequencies at a first location in a transmit/receive window; and detecting the shear or compressional wave energy level at a second location adjacent to the first location in the transmit/receive window.

* * * * *

UNITED STATES PATENT AND TRADEMARK OFFICE
CERTIFICATE OF CORRECTION

PATENT NO. : 11,231,816 B2
APPLICATION NO. : 17/219758
DATED : January 25, 2022
INVENTOR(S) : Khajeh et al.

It is certified that error appears in the above-identified patent and that said Letters Patent is hereby corrected as shown below:

In the Specification

In Column 8, Lines 5-6, after "ultrasonic", delete "touch sensing".

In Column 10, Line 13, after "transducer", delete "304" and insert --302--.

In Column 10, Line 16, after "transducer", delete "304" and insert --302--.

In the Claims

In Column 32, Line 58, in Claim 1, after "level of", delete "the".

In Column 32, Line 61, in Claim 1, before "compressional", delete "the".

In Column 34, Line 54, in Claim 14, after "level of", delete "the".

In Column 34, Line 57, in Claim 14, before "compressional", delete "the".

Signed and Sealed this
Sixth Day of September, 2022

Katherine Kelly Vidal
*Director of the United States Patent and Trademark Office*